United States Patent
Byfield

(10) Patent No.: US 10,539,361 B2
(45) Date of Patent: Jan. 21, 2020

(54) MODULAR LNG PRODUCTION FACILITY

(71) Applicant: Woodside Energy Technologies Pty Ltd., Perth (AU)

(72) Inventor: Geoffrey Brian Byfield, Nedlands (AU)

(73) Assignee: WOODSIDE ENERGY TECHNOLOGIES PTY LTD., Perth (AU)

( * ) Notice: Subject to any disclaimer, the term of this patent is extended or adjusted under 35 U.S.C. 154(b) by 1343 days.

(21) Appl. No.: 13/686,126

(22) Filed: Nov. 27, 2012

(65) Prior Publication Data
US 2014/0053599 A1    Feb. 27, 2014

Related U.S. Application Data

(63) Continuation of application No. PCT/AU2012/001163, filed on Sep. 27, 2012.

(30) Foreign Application Priority Data

Aug. 22, 2012    (AU) ................................ 2012216352

(51) Int. Cl.
*F25J 1/00*    (2006.01)
*B23P 15/26*    (2006.01)

(52) U.S. Cl.
CPC ............. *F25J 1/0022* (2013.01); *B23P 15/26* (2013.01); *Y10T 29/4935* (2015.01); *Y10T 29/49359* (2015.01)

(58) Field of Classification Search
CPC ........ F25J 1/0022; F25J 1/0257; F25J 1/0258; F25J 1/0259; F25J 1/0264; F25J 1/0262;
(Continued)

(56) References Cited

U.S. PATENT DOCUMENTS 1,699,542 A    1/1929   Murray
1,874,578 A    8/1932   Morrison
(Continued)

FOREIGN PATENT DOCUMENTS

AU    2008219346    *   9/2008    ........ F17C 2221/033
AU    2008219346 A1    4/2009
(Continued)

OTHER PUBLICATIONS

Miyake Tanabe, Forced ventilation effect by Air-Fin-Cooler in modularized onshore LNG plant, Sep. 2011.*
(Continued)

*Primary Examiner* — Keith M Raymond
*Assistant Examiner* — Webeshet Mengesha
(74) *Attorney, Agent, or Firm* — Edell, Shapiro & Finnan, LLC

(57) ABSTRACT

A liquefied natural gas production facility and a method of designing and constructing a liquefied natural gas production facility are described. The facility includes space-apart modules for installation at a production location to form a production train including a major axis and a minor axis, each module including a module base for mounting a plurality of plant equipment associated with a selected function assigned to the module, the module base including a major axis and a minor axis. Heat exchangers are arranged to run parallel to the major axis of the production train to form a heat exchanger bank including a major axis and a minor axis, where the major axis of the bank is parallel to the major axis of the train. A subset of the plurality of heat exchangers is arranged on a first level vertically offset from the base of at least one module.

38 Claims, 8 Drawing Sheets

(58) Field of Classification Search
CPC ........ F25J 1/0272; F25J 1/0263; F25J 1/0269;
F25J 1/0271; F25J 1/0296; F25J 1/0275;
F25J 1/0277; F28B 1/06; F28F 2280/00;
Y10T 29/4935
USPC .......................... 62/611, 618, 619; 165/144
See application file for complete search history.

(56) References Cited

U.S. PATENT DOCUMENTS

| | | |
|---|---|---|
| 2,795,937 A | 6/1957 | Sattler et al. |
| 2,833,121 A | 5/1958 | Dorf |
| 2,903,860 A | 9/1959 | Brown |
| 2,938,359 A | 5/1960 | Cobb et al. |
| 2,940,268 A | 6/1960 | Morrison |
| 2,975,607 A | 3/1961 | Bodle |
| 3,001,379 A | 9/1961 | Fukuzawa et al. |
| 3,154,928 A | 11/1964 | Harmens |
| 3,161,492 A * | 12/1964 | Farkas et al. ................... 62/613 |
| 3,208,261 A | 9/1965 | Pasternak |
| 3,350,876 A | 11/1967 | Johnson |
| 3,365,898 A | 1/1968 | Van Kleef |
| 3,421,574 A | 1/1969 | Kals |
| 3,435,623 A | 4/1969 | Tyree |
| 3,438,216 A | 4/1969 | Smith |
| 3,585,959 A | 6/1971 | Cook |
| 3,590,407 A | 7/1971 | Bratianu |
| 3,612,333 A | 10/1971 | Cowles |
| 3,720,057 A | 3/1973 | Arenson |
| 3,768,271 A | 10/1973 | Denis |
| 3,799,253 A * | 3/1974 | Kelp ............................ 165/111 |
| 3,857,245 A | 12/1974 | Jones |
| 3,864,918 A | 2/1975 | Lorenz |
| 3,945,508 A | 3/1976 | Colin |
| 3,986,340 A | 10/1976 | Bivins, Jr. |
| 4,033,135 A | 7/1977 | Mandrin |
| 4,036,028 A | 7/1977 | Mandrin |
| 4,045,972 A | 9/1977 | Tyree, Jr. |
| 4,170,115 A | 10/1979 | Ooka et al. |
| 4,197,712 A | 4/1980 | Zwick et al. |
| 4,224,802 A | 9/1980 | Ooka |
| 4,231,226 A | 11/1980 | Griepentrog |
| 4,305,710 A | 12/1981 | Schneider |
| 4,331,129 A | 5/1982 | Hong et al. |
| 4,399,660 A | 8/1983 | Vogler, Jr. et al. |
| 4,408,943 A | 10/1983 | McTamaney et al. |
| 4,417,878 A | 11/1983 | Koren |
| 4,420,942 A | 12/1983 | Davis et al. |
| 4,487,256 A | 12/1984 | Lutjens et al. |
| 4,519,213 A | 5/1985 | Brigham et al. |
| 4,813,632 A | 3/1989 | Woodhouse |
| 4,819,454 A | 4/1989 | Brigham et al. |
| 4,881,495 A | 11/1989 | Tornare et al. |
| 4,995,234 A | 2/1991 | Kooy et al. |
| 5,095,709 A | 3/1992 | Billiot |
| 5,099,779 A | 3/1992 | Kawaichi et al. |
| 5,129,848 A | 7/1992 | Etheridge et al. |
| 5,147,005 A | 9/1992 | Haeggstrom |
| 5,240,466 A | 8/1993 | Bauer et al. |
| 5,251,452 A | 10/1993 | Wieder |
| 5,292,271 A | 3/1994 | Boatman et al. |
| 5,295,350 A | 3/1994 | Child et al. |
| 5,306,186 A | 4/1994 | Boatman |
| 5,316,509 A | 5/1994 | Boatman et al. |
| 5,351,487 A | 10/1994 | Abdelmalek |
| 5,356,321 A | 10/1994 | Boatman et al. |
| 5,372,531 A | 12/1994 | Boatman et al. |
| 5,375,582 A | 12/1994 | Wimer |
| 5,394,686 A | 3/1995 | Child et al. |
| 5,400,588 A | 3/1995 | Yamane et al. |
| 5,456,622 A | 10/1995 | Breivik et al. |
| 5,457,951 A | 10/1995 | Johnson et al. |
| 5,492,075 A | 2/1996 | Lerstad et al. |
| 5,529,239 A | 6/1996 | Anttila et al. |
| 5,545,065 A | 8/1996 | Breivik et al. |
| 5,564,277 A | 10/1996 | Martin |
| 5,564,957 A | 10/1996 | Breivik et al. |
| 5,584,607 A | 12/1996 | de Baan |
| 5,727,492 A | 3/1998 | Cuneo et al. |
| 5,762,119 A | 7/1998 | Platz et al. |
| 5,819,542 A | 10/1998 | Christiansen et al. |
| 5,820,429 A | 10/1998 | Smedal et al. |
| 5,878,814 A | 3/1999 | Breivik et al. |
| 5,921,090 A | 6/1999 | Jurewicz et al. |
| 5,944,840 A | 8/1999 | Lever |
| 6,003,603 A | 12/1999 | Breivik et al. |
| 6,085,528 A | 7/2000 | Woodall et al. |
| 6,089,022 A | 7/2000 | Zednik et al. |
| 6,094,937 A | 8/2000 | Paurola et al. |
| 6,109,830 A | 8/2000 | de Baan |
| 6,221,276 B1 | 4/2001 | Sarin |
| 6,244,920 B1 | 6/2001 | de Baan |
| 6,263,818 B1 | 7/2001 | Dietens et al. |
| 6,298,671 B1 | 10/2001 | Kenelley et al. |
| 6,354,376 B1 | 3/2002 | De Baan |
| 6,367,258 B1 | 4/2002 | Wen et al. |
| 6,374,591 B1 | 4/2002 | Johnson et al. |
| 6,378,722 B1 | 4/2002 | Dhellemmes |
| 6,517,290 B1 | 2/2003 | Poldervaart |
| 6,546,739 B2 | 4/2003 | Frimm et al. |
| 6,571,548 B1 | 6/2003 | Bronicki et al. |
| 6,581,368 B2 | 6/2003 | Utamura |
| 6,598,401 B1 | 7/2003 | Utamura |
| 6,598,408 B1 | 7/2003 | Nierenberg |
| 6,609,360 B2 | 8/2003 | Utamura |
| 6,622,492 B1 | 9/2003 | Eyermann |
| 6,623,043 B1 | 9/2003 | Pollack |
| 6,637,479 B1 | 10/2003 | Eide et al. |
| 6,644,041 B1 | 11/2003 | Eyermann |
| 6,688,114 B2 | 2/2004 | Nierenberg |
| 6,692,192 B2 | 2/2004 | Poldervaart |
| 6,786,166 B1 | 9/2004 | Marchand et al. |
| 6,811,355 B2 | 11/2004 | Poldervaart |
| 6,889,522 B2 | 5/2005 | Prible et al. |
| 7,219,502 B2 | 5/2007 | Nirenberg |
| 7,287,389 B2 | 10/2007 | Feger |
| 7,293,600 B2 | 11/2007 | Nirenberg |
| 7,493,868 B1 | 2/2009 | Arnal et al. |
| 8,931,217 B2 | 1/2015 | Haney et al. |
| 2002/0047267 A1 | 4/2002 | Zimron et al. |
| 2002/0073619 A1 | 6/2002 | Perkins et al. |
| 2002/0124575 A1 | 9/2002 | Pant et al. |
| 2002/0174662 A1 | 11/2002 | Frimm et al. |
| 2003/0005698 A1 | 1/2003 | Keller |
| 2003/0159462 A1* | 8/2003 | Fanning ................ F25J 1/0022 |
| | | 62/612 |
| 2003/0226487 A1 | 12/2003 | Boatman |
| 2004/0006966 A1 | 1/2004 | Hallman et al. |
| 2004/0025772 A1 | 2/2004 | Boatman |
| 2004/0094082 A1 | 5/2004 | Boatman et al. |
| 2004/0182090 A1 | 9/2004 | Feger |
| 2005/0061002 A1 | 3/2005 | Nierenberg |
| 2005/0120723 A1 | 6/2005 | Baudat |
| 2005/0217314 A1 | 10/2005 | Baudat |
| 2005/0274126 A1 | 12/2005 | Baudat |
| 2006/0010911 A1 | 1/2006 | Hubbard et al. |
| 2006/0053806 A1 | 3/2006 | Tassel |
| 2006/0075762 A1 | 4/2006 | Wijngaarden et al. |
| 2006/0180231 A1 | 8/2006 | Harland et al. |
| 2006/0231155 A1 | 10/2006 | Harland et al. |
| 2007/0193303 A1 | 8/2007 | Hawrysz et al. |
| 2010/0293967 A1* | 11/2010 | Liskow et al. ................. 62/613 |
| 2011/0146164 A1* | 6/2011 | Haney ...................... E04H 5/02 |
| | | 52/79.1 |

FOREIGN PATENT DOCUMENTS

| | | |
|---|---|---|
| DE | 2052154 A | 4/1972 |
| DE | 3035349 | 4/1982 |
| DE | 3338237 | 5/1985 |
| EP | 0134690 A2 | 3/1985 |
| EP | 306972 A1 | 3/1989 |
| GB | 2094461 | 9/1982 |
| GB | 2143022 A | 1/1985 |
| JP | 53126003 | 11/1978 |

(56) References Cited

FOREIGN PATENT DOCUMENTS

| | | |
|---|---|---|
| JP | 54008242 | 1/1979 |
| JP | 58113699 | 7/1983 |
| JP | 59179477 A | 10/1984 |
| JP | 61115795 A | 6/1986 |
| JP | 63203995 A | 8/1988 |
| JP | 63203996 A | 8/1988 |
| JP | 370696 A | 3/1991 |
| JP | 11294694 A | 3/1991 |
| JP | 58788 A | 1/1993 |
| JP | 2001304735 A | 10/2001 |
| JP | 2002340296 | 11/2002 |
| JP | 2003074793 A | 3/2003 |
| JP | 2003148845 A | 5/2003 |
| JP | 200451050 A | 2/2004 |
| JP | 2005098480 | 10/2006 |
| KR | 20010000687 A | 10/2000 |
| KR | 1020070027712 A | 3/2013 |
| WO | 0103793 A1 | 1/2001 |
| WO | 02076819 A1 | 10/2002 |
| WO | 03053774 A1 | 7/2003 |
| WO | 03085317 A1 | 10/2003 |
| WO | 2005056377 A2 | 6/2005 |
| WO | 200511016 A2 | 11/2005 |
| WO | 2006030316 A2 | 3/2006 |
| WO | 2006068832 A1 | 6/2006 |
| WO | 2006088371 A1 | 8/2006 |

OTHER PUBLICATIONS

Zubiate et al., "Single point mooring system for floating LNG plant", Ocean Industry,Nov. 1978, pp. 75, 77, and 78.
Campbell et al., "Shipboard Regasification Terminal", proceedings of the Seventy-Eighth GPA Annual Convention (1999) pp. 295-298.
Van Tassel, "An Economic System for the Liquefaction, Transportation, and Regas of Natural Gas using Surplus LNG Carriers", International Marine Symposium, New York 1984, pp. 171-177.
A.A. Avidan, "Innovative Solutions to Lower LNG Import Terminal Costs for Emerging LNG markets", presented at Gastech Nov. 29, 1998—Dec. 2, 1998, 11 pages.
Boylston, "Concept Proposal for the Transportation and Regasification of Liquid Natural Gas", Argent Marine Operations Inc., published 1996, 13 pages.
Rajabi et al., "The Heidrun Field: Oil Offtake System", OTC 8102, Offshore Technology Conference, May 6-9, 1996, 11 pages.
"High purity, high flow rate vaporization presents a system challenge for Cryoquip engineers", Frostbite Newsletter from Cryogenic Industries, vol. 12, No. 1, Spring 2002, 8 pages.
"Cryoquip engineers a unique heat exchanger with very high thermal efficiency", Frostbite Newsletter from Cryogenic Industries, vol. 13, No. 3, Spring 2003, 8 pages.
"Vaporizer ice build-up requires an analysis of switching issues for ambient air units", Frostbite Newsletter from Cryogenic Industries, vol. 8, No. 2, Winter 1996, 8 pages.
"Sub-Zero pumps achieve 85% efficiency levels", Frostbite Newsletter from Cryogenic Industries, vol. 9, No. 1, Spring 1998, 8 pages.

"LNG Receiving Terminal at Dahej, Gujarat, India", Paper Sessions, Thirteenth International Conference & Exhibition on Liquefied Natural Gas, Seoul, Korea, May 14-17, 2001, 9 pages.
Stone, et al. "Offshore LNG Loading Problem Solved", Gastech, 2000.
Larsen, et al. "SRV, The LNG Shuttle and Regas Vessel System", Offshore Technology Conference 16580, Houston, May 2004.
FERC Publication, "Draft Environmental Impact Statement for Dominion Cove Point LNG . . . ", Chapter 23, p. 3-6 Oct. 2005.
Excelerate, LLC "Breaking the Traditional Model—Bringing Continents of Energy Together, Energy Bridge", CWC Sixth Annual World LNG Summit Rome 2005, Nov. 2005.
Hoegh LNG, "Future Technological Challenges in LNG Shipping", LNG Journal, Norshipping, 2005.
Cook, J.W., "Special Session: Energy Bridge LNG Projects: Gulf Gateway Energy Bridge—The First Year of Operations and the Commercial and Operational Advantages of the Energy Bridge Technology", Offshore Technology Conference 18396, Houston, May 2006.
Worthington, W.S. and B.S. Hubbard, "Improved Regasification Methods Reduce Emissions", Hydrocarbon Processing, Gulf Publishing co., pp. 51-54, HydrocarbonProcessing.com, Jul. 2005.
Lane, Mark, "Energy Bridge Maximizing Utilization," presented to the United States Coast Guard, Port Arthur, TX, Jun. 16, 2005, 18 pages.
Excelerate Energy Limited Partnership, "Lessons Learned from Permitting, Building, and Operating the Gulf Gateway Energy Bridge Deepwater Port," Oil & Gas IQ Conference, LNG Terminals: Sitting, Permitting, and Financing a Successful LNG Project, Costa Mesa, CA, Sep. 14, 2005, 25 pages.
Bryngelson, Rob, "Excelerate Energy Northeast Gateway and Gulf Gateway Deepwater Port Update," Northeast Energy and Commerce Association, 11th Annual Conference on Natural Gas Issues, Boston, MA, Sep. 19, 2005, 13 pages.
Cook, Jonathan & Lane, Mark, "LNG Ship-to-Ship Transfer," SIGTTO, Houston, TX, Nov. 18, 2005, 21 pages.
Excelerate Energy Limited Partnership, "Liquefied Natural Gas Storage and Transport for Russia," presented to the U.S. Department of Commerce SABIT Group Program, The Woodlands, Texas, Aug. 31, 2006, 36 pages.
Excelerate Energy, "Development Information", www.excelerateenergy.com (Nov. 30, 2005), pp. 1-3.
Excelerate Energy, "Energy Bridge Regasification Vessels", www.excelerateenergy.com (Nov. 30, 2005), 1 page.
Northeast Gateway Deepwater Port (NGDP) Jun. 13, 2005.
Lightering 101—Introduction to Lightering, on the internet on Mar. 1, 2003.
Matsui et al., "Mid-Small Scale LNG Plant-Compact, Pre-Assembled and Standardized Design", International Conference and Exhibition on Liquefied Natural Gas, vol. 16, Apr. 18, 2010, pp. 1-11, XP009144850.
Fisher et al., "A New LNG Process is Now Available", GPA Technical Meeting, Feb. 1, 2002, 12 pages, XP007912226.
Examination Report for counterpart European Patent Application No. 12780071.2 , dated Mar. 31, 2017, 7 pages.
Woodside, "Next Generation Modular LNG, Modularised LNG Improves Construction Efficiency", May 2012, 1 page.

\* cited by examiner

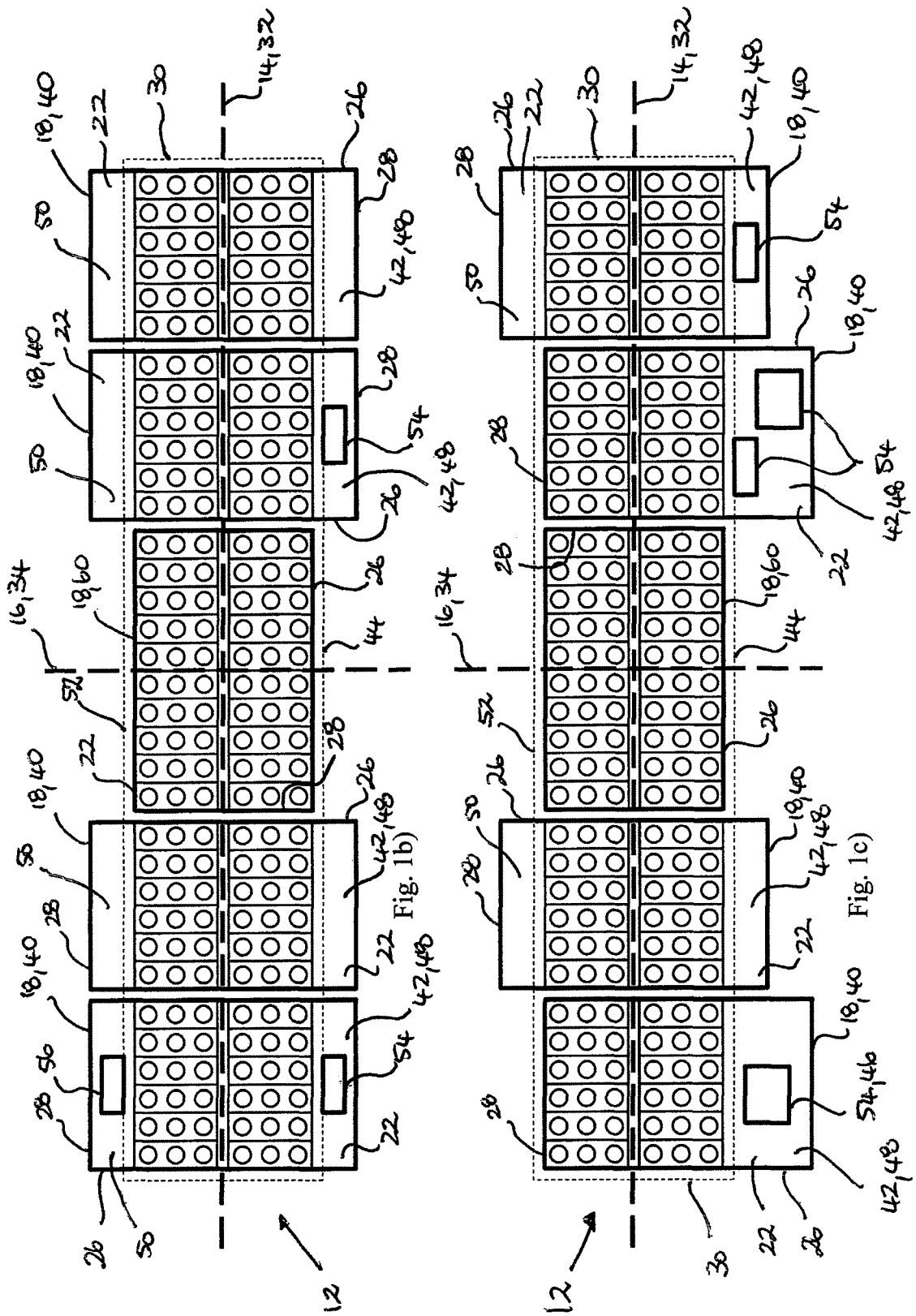

MODULAR LNG PRODUCTION FACILITY

CROSS-REFERENCE TO RELATED APPLICATIONS

This application is a continuation of International Patent Application No. PCT/AU2012/001163 and filed Sep. 27, 2012, which claims priority from Australian Application No. AU 2012216352 and filed Aug. 22, 2012, the disclosures of which are incorporated herein by reference in their entireties.

FIELD

The present invention relates to a compact modularised liquefied natural gas (LNG) production facility.

BACKGROUND

Natural gas ("NG") is routinely transported from one location to another location in its liquid state as "Liquefied Natural Gas" (LNG). Liquefaction of the natural gas makes it more economical to transport as LNG occupies only about $\frac{1}{600}^{th}$ of the volume that the same amount of natural gas does in its gaseous state. After liquefaction, LNG is typically stored in cryogenic containers either at or slightly above atmospheric pressure. LNG is regasified before distribution to end users through a pipeline or other distribution network at a temperature and pressure that meets the delivery requirements of the end users.

Wellhead gas is subjected to gas pre-treatment to remove contaminants prior to liquefaction. The hydrogen sulphide and carbon dioxide can be removed using a suitable process such as amine adsorption. Removal of water can be achieved using conventional methods, for example, a molecular sieve. Depending on the composition of contaminants present in the inlet gas stream, the inlet gas stream may be subjected to further pre-treatment to remove other contaminants, such as mercury and heavy hydrocarbons prior to liquefaction. Liquefaction is achieved using methods that are well established in the art which typically involve compression and cooling. Such processes include the APCI C3/MR™ or Split MR™ or AP-X™, processes, the Phillips Optimized Cascade Process, the Linde Mixed Fluid Cascade process or the Shell Double mixed Refrigerant or Parallel Mixed Refrigerant process. Regardless of the choice of liquefaction process, refrigerants are used to reduce the temperature of the treated wellhead gas to a temperature of around −160° C. to form LNG, resulting in warming of the refrigerant which must be compressed for recycle to the liquefaction process. The compressors used for this duty are traditionally gas turbines or electric motors depending on the power requirements and layout issues of a particular LNG production facility. The coolers required for the various compression and heat exchanger operations associated with an LNG plant may be air coolers or water coolers arranged in a heat exchanger bank.

Prior art modularised LNG production trains have been closely based upon the design and layout of the more traditional stick-built LNG production trains. Until now, modularisation has been conducted by slicing up an existing stick built LNG train design into transportable sections, leading to some compromises regarding the placement of the module boundaries. Prior art examples of modularization of a traditional stick-built air-cooled LNG train have relied on dividing the air-cooled heat exchanger bank into the smallest number of modules possible for a given size of air cooler within the air-cooled heat exchanger bank. To keep the overall plot size of the LNG production facility to a minimum, it is known to arrange sub-sections of the air-cooled heat exchanger bank over the top of each module so as to cover one hundred percent of the area defined by the base of said module with a view to making the air-cooled heat exchanger bank as large as possible for a given module size. Having made the decision to fully cover each of the modules with a portion of the air-cooled heat exchanger bank, selected larger or taller pieces of process equipment operatively associated with each module, such as pressure vessels, compressors and the cryogenic heat exchanger are either stick built or constructed as separate modules which are designed to remain uncovered by the air-cooled heat exchanger bank.

The overall footprint of such modularised LNG production plants is large because sufficient plot space needs to be allocated to allow for covered modules incorporating the air-cooled heat exchanger bank to be positioned in a straight line running along the central longitudinal axis of the LNG production facility with the uncovered modules being offset from the central longitudinal axis and located on one side or the other side of the centrally located air-cooled heat exchanger bank. This prior art arrangement has several disadvantages. A high number of interconnections are required across the modules between the air-cooled heat exchanger bank covered modules and the associated equipment located on an adjacent uncovered module. The use of a large number of small modules inevitably requires that the air coolers within the air-cooled heat exchanger bank that are required to perform cooling duty for a particular module will need to span across at least two modules, preventing fluid circulation through the air coolers until these two modules are joined at the production location. These prior art designs rely on duplication of structural steel as there is inevitably a large amount of void space underneath the air-cooled heat exchanger bank in addition to the structural steel that is used for the uncovered spatially offset process equipment modules.

There remains a need to explore alternative designs for a modular LNG production plant to alleviate at least one of these problems.

SUMMARY

According to a first aspect of the present invention there is provided a liquefied natural gas production facility comprising:
  a plurality of space-apart modules for installation at a production location to form a production train having a major axis and a minor axis, each module having a module base for mounting a plurality of plant equipment associated with a selected function assigned to said module, the module base having a major axis and a minor axis; and,
  a plurality of heat exchangers arranged to run parallel to the major axis of the production train to form a heat exchanger bank having a major axis and a minor axis, wherein the major axis of the bank is parallel to the major axis of the train;
  wherein a subset of the plurality of heat exchangers is arranged on a first level vertically offset from the base of at least one module to form a partially covered module, and wherein the major axis of the partially covered module is arranged to lie perpendicular to the major axis of the train when the partially covered module is installed at the production location.

In one form, the heat exchanger bank has a footprint and the base of the partially covered module projects transversely outwardly beyond the footprint of the heat exchanger bank to provide an uncovered section of the module base on a first side of the heat exchanger bank and wherein the uncovered section of the module base is sized for mounting a selected piece of process equipment.

In one form, the heat exchanger bank has a footprint and the base of the partially covered module projects transversely outwardly beyond the footprint of the heat exchanger bank to provide a first uncovered section of the module base on a first side of the heat exchanger bank and a second uncovered side of the module base on a second side of the heat exchanger bank, wherein the first uncovered section is sized for mounting a first selected piece of process equipment and the second uncovered section is sized for mounting a second selected piece of process equipment.

In one form, one or both or the first and second selected pieces of equipment is a rotating piece of equipment associated with a circulating refrigerant. In one form, one or both or the first and second selected pieces of equipment is a piece of equipment having a flammable inventory. In one form, one or both or the first and second selected pieces of equipment is a long lead-time piece of equipment. In one form, one or both or the first and second selected pieces of equipment is a piece of equipment having an overall height that is taller than the height of the first level.

In one form, at least one of the plurality of modules is constructed at a construction location or assembled at an assembly location prior to transport to the production location, and wherein the at least one module is tested for verification purposes at the construction or assembly location.

In one form, the heat exchanger bank is arranged such that a subset of the plurality of heat exchangers that is operatively associated with the selected function of a module is arranged on a first level vertically offset from the base of said module.

In one form, the heat exchanger bank is arranged such that a subset of the plurality of heat exchangers that is operatively associated with the selected function of a module is arranged on a first level vertically offset from the base of said module and an adjacent module.

In one form, each of the plurality of modules is a partially covered module.

In one form, at the subset of heat exchangers of least one module has a footprint that covers at least 90% of the footprint of the module base to form a fully covered module having a major axis and a minor axis, the major axis of the fully covered module being arranged to lie parallel to the major axis of the train when the fully covered module is installed at the production location.

In one form, one of the plurality of modules is a pre-treatment module for removing contaminants from a natural gas feed stream to produce a pre-treated natural gas stream.

In one form, the pre-treatment module is a partially covered module having a first uncovered section of the base on a first side of the heat exchanger bank and a second uncovered section of the module on a second side of the heat exchanger bank after installation at the production location.

In one form, one of the plurality of modules is a first refrigerant condenser module for pre-cooling a pre-treated natural gas stream to produce a pre-cooled gas stream and a first refrigerant vapour stream.

In one form, the first refrigerant condenser module is a fully covered module.

In one form, one of the plurality of modules is a first refrigerant compression module for compressing a first refrigerant vapour stream to produce a compressed first refrigerant stream for recycle to a first refrigerant condenser module.

In one form, the first refrigerant compression module is a partially covered module having a first uncovered section of the base on a first side of the heat exchanger bank and a second uncovered section of the module on a second side of the heat exchanger bank after installation at the production location.

In one form, one of the plurality of modules is a liquefaction module operatively associated with a main cryogenic heat exchanger for further cooling a pre-cooled gas stream through indirect heat exchange with a second refrigerant to produce a liquefied natural gas product stream and a second refrigerant vapour stream.

In one form, the liquefaction module is a partially covered module having a first uncovered section of the base on a first side of the heat exchanger bank and a second uncovered section of the module on a second side of the heat exchanger bank after installation at the production location.

In one form, one of the plurality of modules is a second refrigerant compression module for compressing a second refrigerant vapour stream to produce a compressed second refrigerant stream for recycle to a main cryogenic heat exchanger.

In one form, the second refrigerant compression module is a partially covered module having a first uncovered section of the base on a first side of the heat exchanger bank and a second uncovered section of the module on a second side of the heat exchanger bank after installation at the production location.

In one form, a first refrigerant compressor is arranged on the first uncovered section and a second refrigerant compressor is arranged on the second uncovered section.

In one form, one or both of the first and second compressors is a variable speed compressor.

In one form, one or both of the first and second compressors is driven by an aero-derivative gas turbine.

In one form, the first refrigerant is propane. In one form, the second refrigerant is a mixed refrigerant hydrocarbon mixture.

In one form, each of the plurality of modules is substantially equally sized.

In one form, each of the plurality of modules has a weight in the range of 2000 to 8000 tons or 3000 to 4000 tons.

In one form, the production location is onshore, offshore on a floating facility, offshore on a fixed facility, barge-mounted or grounded facility.

In one form, the heat exchangers are air-cooled heat exchangers.

According to a second aspect of the present invention there is provided a module for use in any one form of the liquefied natural gas production facility of the first aspect of the present invention.

According to a second aspect of the present invention there is provided a method of designing or constructing a liquefied natural gas production facility, the method comprising the steps of:
  providing a plurality of space-apart modules for installation at a production location to form a production train having a major axis and a minor axis, each module having a module base for mounting a plurality of plant equipment associated with a selected function assigned to said module, the module base having a major axis and a minor axis; and, arranging a plurality of heat exchangers to run parallel to the major axis of the production train to form a heat exchanger bank having a major axis and a minor axis, wherein the major axis of the bank is parallel to the major axis of the train;

arranging a subset of the plurality of heat exchangers on a first level vertically offset from the base of at least one module to form a partially covered module; and, arranging the major axis of the partially covered module to lie perpendicular to the major axis of the train when the partially covered module is installed at the production location.

In one form, the heat exchanger bank has a footprint and the base of the partially covered module projects transversely outwardly beyond the footprint of the heat exchanger bank to provide an uncovered section of the module base on a first side of the heat exchanger bank and wherein the uncovered section of the module base is sized for mounting a selected piece of process equipment.

In one form, the heat exchanger bank has a footprint and the base of the partially covered module projects transversely outwardly beyond the footprint of the heat exchanger bank to provide a first uncovered section of the module base on a first side of the heat exchanger bank and a second uncovered side of the module base on a second side of the heat exchanger bank, wherein the first uncovered section is sized for mounting a first selected piece of process equipment and the second uncovered section is sized for mounting a second selected piece of process equipment.

In one form, one or both or the first and second selected pieces of equipment is a rotating piece of equipment associated with a circulating refrigerant.

In one form, one or both or the first and second selected pieces of equipment is a piece of equipment having a flammable inventory.

In one form, one or both or the first and second selected pieces of equipment is a long lead-time piece of equipment.

In one form, one or both or the first and second selected pieces of equipment is a piece of equipment having an overall height that is taller than the height of the first level.

In one form, at least one of the plurality of modules is constructed at a construction location or assembled at an assembly location prior to transport to the production location, and wherein the at least one module is tested for verification purposes at the construction or assembly location.

In one form, the heat exchanger bank is arranged such that a subset of the plurality of heat exchangers that is operatively associated with the selected function of a module is arranged on a first level vertically offset from the base of said module.

In one form, the heat exchanger bank is arranged such that a subset of the plurality of heat exchangers that is operatively associated with the selected function of a module is arranged on a first level vertically offset from the base of said module and an adjacent module.

In one form, each of the plurality of modules is a partially covered module.

In one form, at the subset of heat exchangers of least one module has a footprint that covers at least 90% of the footprint of the module base to form a fully covered module having a major axis and a minor axis, the major axis of the fully covered module being arranged to lie parallel to the major axis of the train when the fully covered module is installed at the production location.

In one form, one of the plurality of modules is a pre-treatment module for removing contaminants from a natural gas feed stream to produce a pre-treated natural gas stream.

In one form, the pre-treatment module is a partially covered module having a first uncovered section of the base on a first side of the heat exchanger bank and a second uncovered section of the module on a second side of the heat exchanger bank after installation at the production location.

In one form, one of the plurality of modules is a first refrigerant condenser module for pre-cooling a pre-treated natural gas stream to produce a pre-cooled gas stream and a first refrigerant vapour stream. In one form, the first refrigerant condenser module is a fully covered module.

In one form, one of the plurality of modules is a first refrigerant compression module for compressing a first refrigerant vapour stream to produce a compressed first refrigerant stream for recycle to a first refrigerant condenser module.

In one form, the first refrigerant compression module is a partially covered module having a first uncovered section of the base on a first side of the heat exchanger bank and a second uncovered section of the module on a second side of the heat exchanger bank after installation at the production location.

In one form, one of the plurality of modules is a liquefaction module operatively associated with a main cryogenic heat exchanger for further cooling a pre-cooled gas stream through indirect heat exchange with a second refrigerant to produce a liquefied natural gas product stream and a second refrigerant vapour stream.

In one form, the liquefaction module is a partially covered module having a first uncovered section of the base on a first side of the heat exchanger bank and a second uncovered section of the module on a second side of the heat exchanger bank after installation at the production location.

In one form, one of the plurality of modules is a second refrigerant compression module for compressing a second refrigerant vapour stream to produce a compressed second refrigerant stream for recycle to a main cryogenic heat exchanger.

In one form, the second refrigerant compression module is a partially covered module having a first uncovered section of the base on a first side of the heat exchanger bank and a second uncovered section of the module on a second side of the heat exchanger bank after installation at the production location.

In one form, a first refrigerant compressor is arranged on the first uncovered section and a second refrigerant compressor is arranged on the second uncovered section.

In one form, one or both of the first and second compressors is a variable speed compressor.

In one form, one or both of the first and second compressors is driven by an aero-derivative gas turbine.

In one form, the first refrigerant is propane. In one form, the second refrigerant is a mixed refrigerant hydrocarbon mixture.

In one form, each of the plurality of modules is substantially equally sized.

In one form, each of the plurality of modules has a weight in the range of 2000 to 8000 tons or 3000 to 4000 tons.

In one form, the production location is onshore, offshore on a floating facility, offshore on a fixed facility, barge-mounted or grounded facility.

In one form, the heat exchangers are air-cooled heat exchangers.

BRIEF DESCRIPTION OF THE DRAWINGS

In order to facilitate a more detailed understanding of the nature of the invention several embodiments of the present invention will now be described in detail, by way of example only, with reference to the accompanying drawings, in which:

FIG. 1b is a schematic plan view of a second embodiment of the present invention;

FIG. 1c is a schematic plan view of a third embodiment of the present invention;

DETAILED DESCRIPTION

Figure 1A:
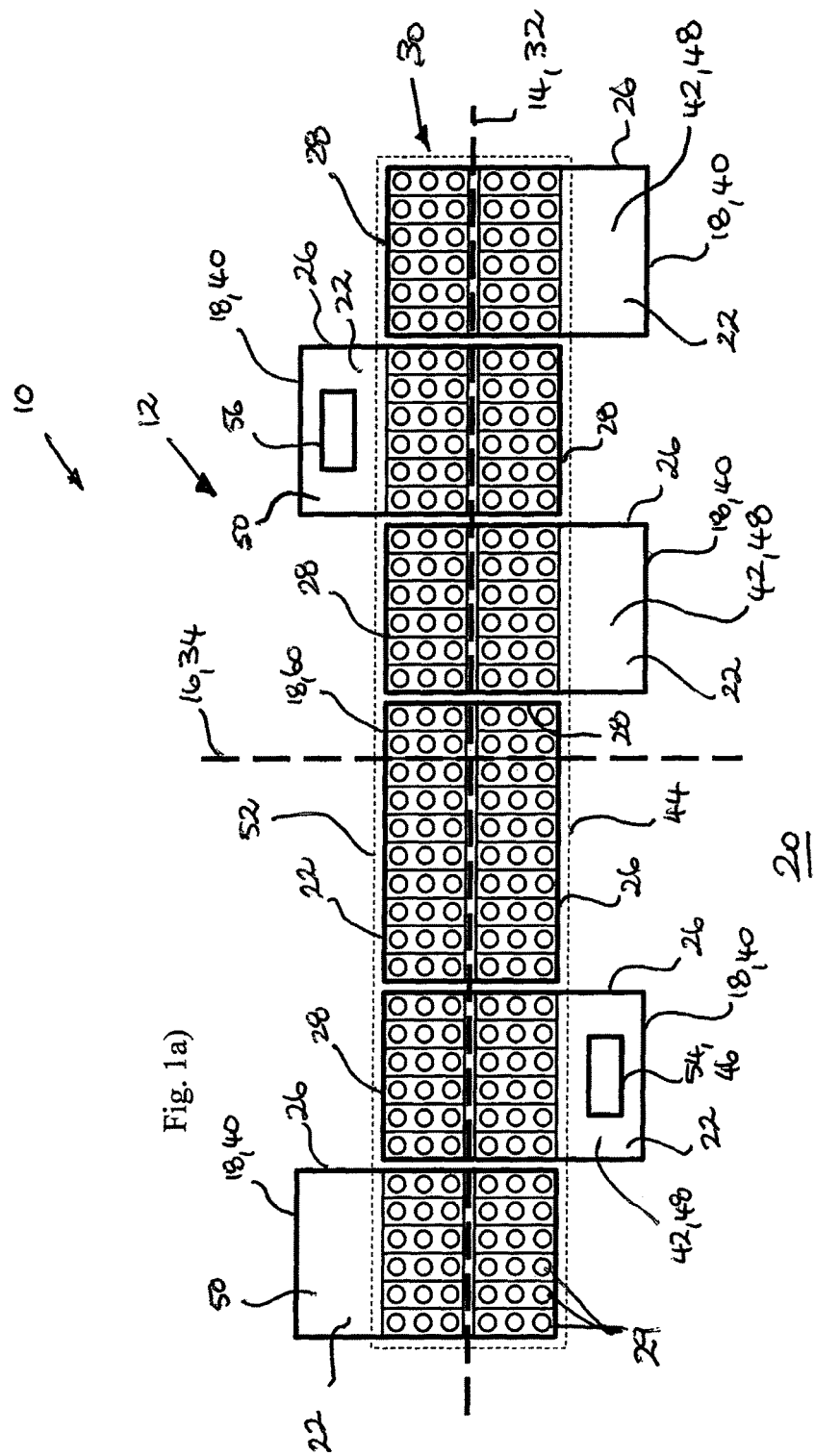
FIG. 1a is a schematic plan view of a first embodiment of the present invention.
Figure 2:
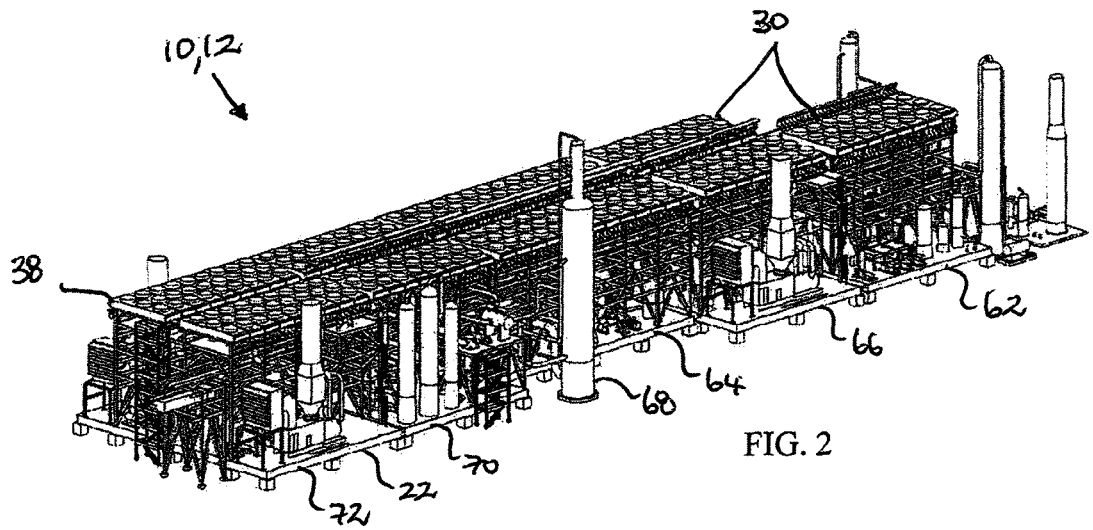
FIG. 2 is an isometric view from one direction of a detailed embodiment of an LNG production train of the present invention.
Figure 3:
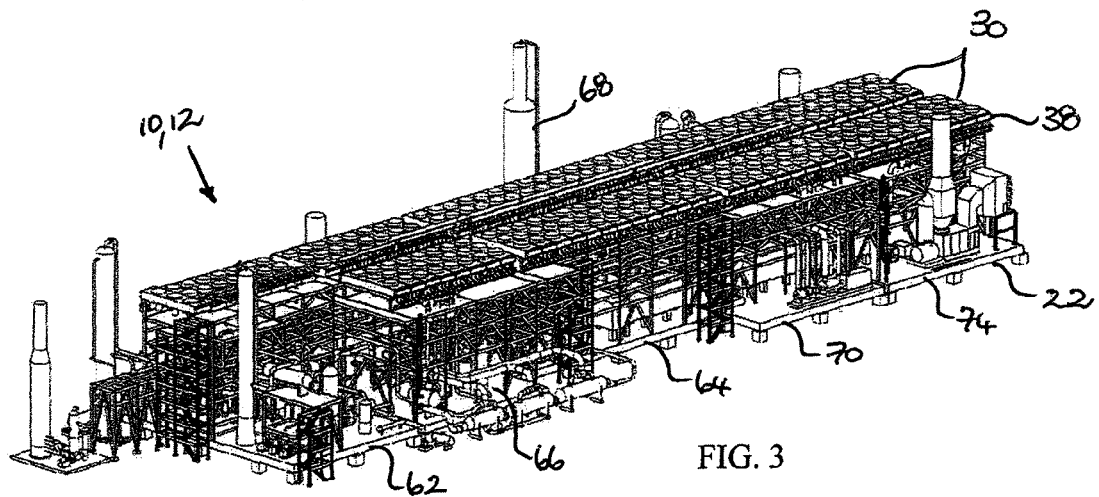
FIG. 3 is an isometric view of the LNG production train of FIG. 2 taken from a second direction.

Particular embodiments of the present invention are now described. The terminology used herein is for the purpose of describing particular embodiments only, and is not intended to limit the scope of the present invention. Unless defined otherwise, all technical and scientific terms used herein have the same meanings as commonly understood by one of ordinary skill in the art to which this invention belongs. Like reference numerals refer to like parts.

The term "stick-built" or "off-module" refers to a plant or a section of a plant that is constructed predominantly on a production location which the plant is intended to occupy upon completion of construction of the plant. In contrast, the term "module" refers to a section of a plant that is pre-assembled at a construction or assembly location remote from the production location. Each module is designed to be transported from the construction or assembly location to the production location by towing or on floating barges or by land using rail or truck. After each module is moved from the construction or assembly location to the production location, the module is positioned in a suitable pre-determined orientation to suit the needs of a given LNG production facility.

The term "train" refers to facilities used for the pre-treatment of a natural gas feed stream to remove contaminants and facilities used for receiving pre-treated gas and subjecting the pre-treated gas to cooling to form liquefied natural gas.

Referring to FIG. 1a, the present invention relates to an LNG production facility (10) including at least one elongated LNG production train (12) having a major axis (14) and a minor axis (16). The at least one train may be one of a plurality of trains. The LNG production train includes a plurality of space-apart modules (18) that are constructed at a construction location or assembled at an assembly location and then transported to a production location (20) for installation. Each module (18) has a module base (22) for mounting a plurality of plant equipment (24) associated with the selected function assigned to that module, the base (22) having a major axis (26) and a minor axis (28) with the major axis being perpendicular to the minor axis. The major and minor axes (26 and 28, respectively) form a horizontal plane. When the base (22) is rectangular, the major axis (26) is longer than the minor axis (24). When the base is square, the major axis is equal to the minor axis. When installed at the production location, the horizontal plane defined by the base of each module will rest on an area of ground, defining a footprint for that module.

The LNG production facility further includes a plurality of heat exchangers (29) arranged to run parallel to the major axis (14) of the elongated production train (12) to form a heat exchanger bank (30) having a major axis (32) and a minor axis (34). The major axis (34) of the heat exchanger bank (30) is parallel to the major axis (14) of the LNG production train (12). In addition to this, a subset (36) of the plurality of heat exchangers is arranged on a first level (38) vertically offset from the base (22) of at least one module (18) to form a partially covered module (40). This arrangement is used to minimize the plot space required for the LNG production facility (10). The major axis (26) of the partially covered module (40) is arranged to lie perpendicular to the major axis (14) of the train when the partially covered module (40) is installed at the production location (20). In a preferred embodiment of the present invention, each of the plurality of modules may be covered by a subset of the plurality of heat exchangers. However, the LNG production train may include at least one module that remains uncovered by any of the plurality of heat exchangers.

The heat exchanger bank (30) has a footprint and the base (22) of the partially covered module (40) projects transversely to the major axis of the train (12) so as to extend beyond the footprint of the heat exchanger bank (30) to provide an uncovered section (42) of the module base (22) on a first side (44) of the heat exchanger bank (30). The uncovered section of the module base is sized for mounting a selected piece of process equipment (46) as illustrated in FIG. 1a. Alternatively, the base (22) of the partially covered module (40) projects transversely outwardly beyond the footprint of the heat exchanger bank (30) to provide a first uncovered section (48) of the module base (22) on a first side (44) of the heat exchanger bank (30) and a second uncovered side (50) of the module base (22) on a second side (52) of the heat exchanger bank (30). The first uncovered section (48) is sized for mounting a first selected piece of process equipment (54). The second uncovered section (50) is sized for mounting a second selected piece of process equipment (56). In FIG. 1c, some of the partially uncovered modules (40) are arranged to have just one covered section (42) whilst other partially covered modules (40) are arranged to have a first uncovered section (48) of the module base (22) on a first side (44) of the heat exchanger bank (30) and a second uncovered section (50) of the module base (22) on a second side (52) of the heat exchanger bank (30). The selected pieces of equipment (46, 54 or 56) may be a rotating piece of equipment associated with a circulating refrigerant, a high construction cost piece of equipment, a maintenance-intensive piece of equipment, a high hydrocarbon inventory piece of equipment, a long lead-time piece of equipment, or, a piece of equipment having an overall height that is taller than the height of the first level.

Within each module, the pieces of equipment required to perform the pre-determined function assigned to that module are arranged to minimize interfaces between modules so as to minimize the hook-up that is required to be completed when the modules are delivered from a construction location or assembly location to the production location. In this way, a module can be essentially self-contained and provided with a temporary control system to allow the module to be switched on for loop checks and commissioning at the construction or assembly location prior to transport to the production location. Upon arrival at the production location, wireless control may be used for inter-modular communication and control to further reduce the hook-up time. At a production location where it is important to minimize the length of interconnecting pipe runs between modules, the plurality of modules are spaced as closely as possible, while still allowing sufficient room at the production location to hook up the interconnections between modules.

Figure 4:
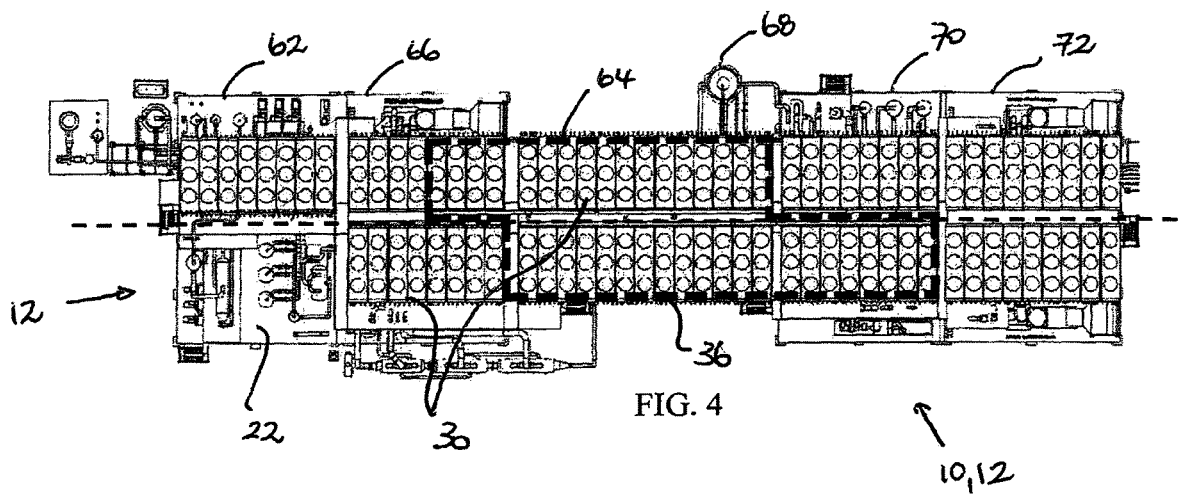
FIG. 4 is a plan view of the LNG production train of FIG. 2.

The present invention relies in part on a decision to place substantially all of the equipment required to perform the pre-determined function assigned to each module within each module. Preferably, this includes arranging the heat exchanger bank so that the subset of the plurality of heat exchangers that is operatively associated with the pre-determined function of each module is placed within the module that performed that pre-determined function. This arrangement allows for a reduction in the number of cross-module interconnections between the heat exchangers and the related process equipment. However, if required, one or more of the subset of heat exchangers (36) which are operatively associated with a first module (for example, the propane condenser module (64)) may be located on an adjacent module (for example the liquefaction module (70)) as illustrated by the heavy dotted line in FIG. 4, to minimise the total footprint whilst maximising total heat exchanger capacity. In this way, the subset of heat exchangers (36) is arranged to span across a plurality of adjacent modules when installed at the production location (20).

It can be clearly seen from FIGS. 1*a*, 1*b* and 1*c* that subset of heat exchangers associated with each partially covered module are positioned in such a way that when the plurality of modules (18) are installed at the production location (20), the plurality of heat exchangers (29) run parallel to the major axis (14) of the elongated production train (12) to form the heat exchanger bank (30).

A module which has a pre-determined function that requires a large number of heat exchangers in a given subset may be fully covered with heat exchangers. The term 'fully covered module' (60) is used herein to describe a module for which the footprint of the subset of heat exchangers covers at least 90% of the footprint of the module base. For those modules which have pre-determined function that requires a smaller subset of operatively associated heat exchangers, the module can be a partially covered module. The uncovered section is designed and sized to be sufficiently large to accommodate a selected piece of equipment, preferably a selected piece of equipment that performs the function assigned to the partially covered module. By definition, using this arrangement, the major axis (26) of each of the fully covered modules (60) runs parallel to the major axis (14) of the LNG production train. In this way, a fully covered module (60) is designed to be rotated at right angles to a partially covered module (40).

The uncovered sections of the partially covered modules allow unobstructed overhead crane access to the selected pieces of equipment as well as improved side access making construction or maintenance activities for the selected pieces of equipment easier to perform. Extending the footprint of the module base relative to the footprint of the module's subset of heat exchangers allows for installation and positioning of the selected pieces of equipment in a less congested area of the module which has the flow-on benefit of allowing the selected pieces of equipment to be the last pieces of equipment that are installed on each module. The selected pieces of equipment may be high construction cost equipment, long lead-time equipment, or large pieces of equipment that have an overall height that is taller than the height of the elevated first level occupied by the subset of heat exchangers in the bank. The long lead items which need to be incorporated into the module late in the construction sequence may be installed at the construction or assembly location or at the production location to optimise the construction scheduling requirements of a particular LNG production facility.

Advantageously, each partially covered module can be tested for verification purposes at a construction or assembly location remote from the production location. In circumstances where a subset of the heat exchangers operatively associated with a fully covered module need to be arranged above both the fully covered module and an adjacent partially covered module, pre-commissioning testing and verification of the fully covered module occurs after installation of both modules at the production location.

One embodiment of an LNG production facility using the method and system of the present invention will now be described in detail with reference to FIGS. 2 to 14. In general terms, the method for liquefying a natural gas stream comprises the steps of:

a) pre-treating a natural gas feed stream in a pre-treatment module (62) to produce a pre-treated natural gas stream;

b) pre-cooling the pre-treated natural gas stream in a first refrigerant condenser module (64) to produce a pre-cooled gas stream and a first refrigerant vapour stream;

c) compressing the first refrigerant vapour stream in a first refrigerant compression module (66) to produce a compressed first refrigerant stream for recycle to step b);

d) further cooling the pre-cooled gas stream in a main cryogenic heat exchanger (68) operatively associated with a liquefaction module (70) through indirect heat exchange with a second refrigerant to produce a liquefied natural gas product stream and a second refrigerant vapour stream;

e) compressing the second refrigerant vapour stream in a second refrigerant compression module (72) to produce a compressed second refrigerant stream for recycle to step d).

In the detailed discussion of various embodiments of the present invention below, the first refrigerant is propane while the second refrigerant is a mixed refrigerant hydrocarbon mixture. This type of process is known as the propane pre-cooled mixed refrigerant, or C3MR process, which is used to manufacture most of the LNG produced worldwide and is a process that is not further discussed here is it considered to be well known to the person skilled in the art. When using propane as the first refrigerant, care is taken to ensure that propane does not leak because propane vapour is highly flammable. Using the system of the present invention, the process equipment required for propane compression is grouped together within the propane compression module to facilitate the pre-commissioning and commissioning of the module—having all of the accessories that you need to circulate fluid through the compressor at the construction or assembly location. To further improve safely, the main rotating equipment associated with the propane circuits is placed on the uncovered sections of the partially covered modules rather than underneath the heat exchangers arranged on the first level. In one embodiment, the main rotating equipment is positioned on the first uncovered section of a module with the main hydrocarbon inventory positioned on a second uncovered section of the module. Using this arrangement, both sets of equipment avoid an otherwise congested area underneath the operatively associated heat exchangers whilst at the same time ensuring that the main hydrocarbon inventory is located away from the main rotating equipment.

In the embodiment illustrated in FIGS. 2 to 14, the LNG production facility has a single LNG production train which includes the following substantially equally sized modules:
 a) a pretreatment module;
 b) a first refrigerant compression module (in this example, a propane compression module);
 c) a first refrigerant condenser module (in this example, a propane condenser module);
 d) a liquefaction module; and,
 e) a second refrigerant compression module (in this example, a mixed refrigerant (MR) compression module.

The arrangement of the equipment within the modules has been made with construction, maintenance and safety in mind. The main rotating equipment has all been placed upon the module edges rather than underneath the heat exchangers. This permits good access for maintenance and allows the long lead items to be incorporated into the module late in the construction sequence. The main hydrocarbon inventories have avoided the congested area underneath the heat exchangers, and have been located away from the main rotating equipment. Elevated platforms with crane access have been provided for the installation of relief and recycle valves.

Figure 5:
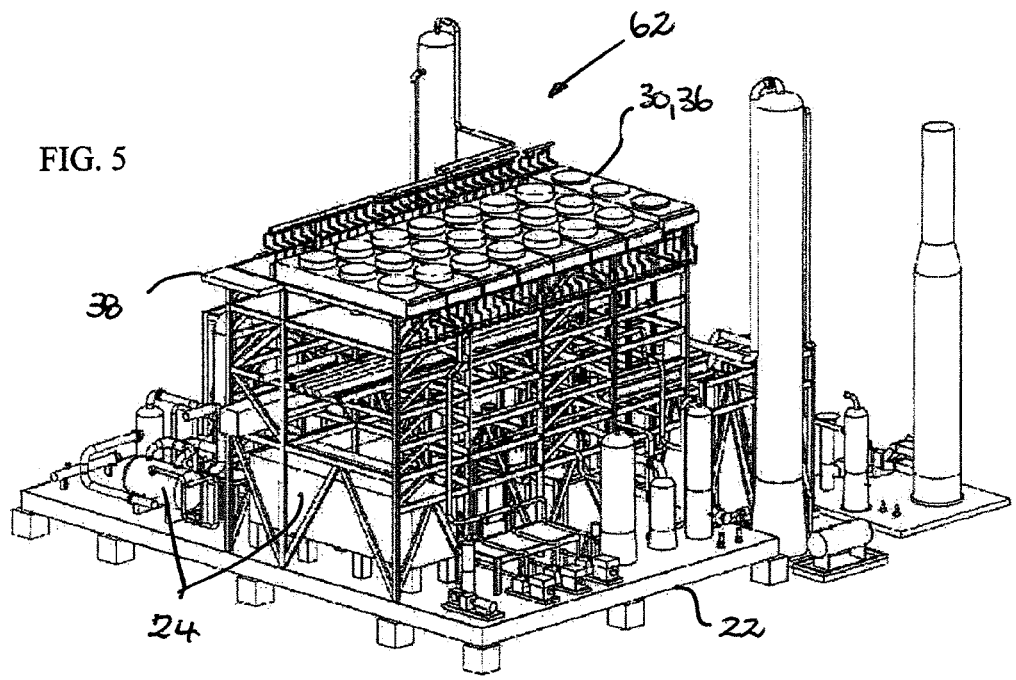
FIG. 5 is an isometric view of the pre-treatment module of the LNG production train illustrated in FIG. 2.
Figure 6:
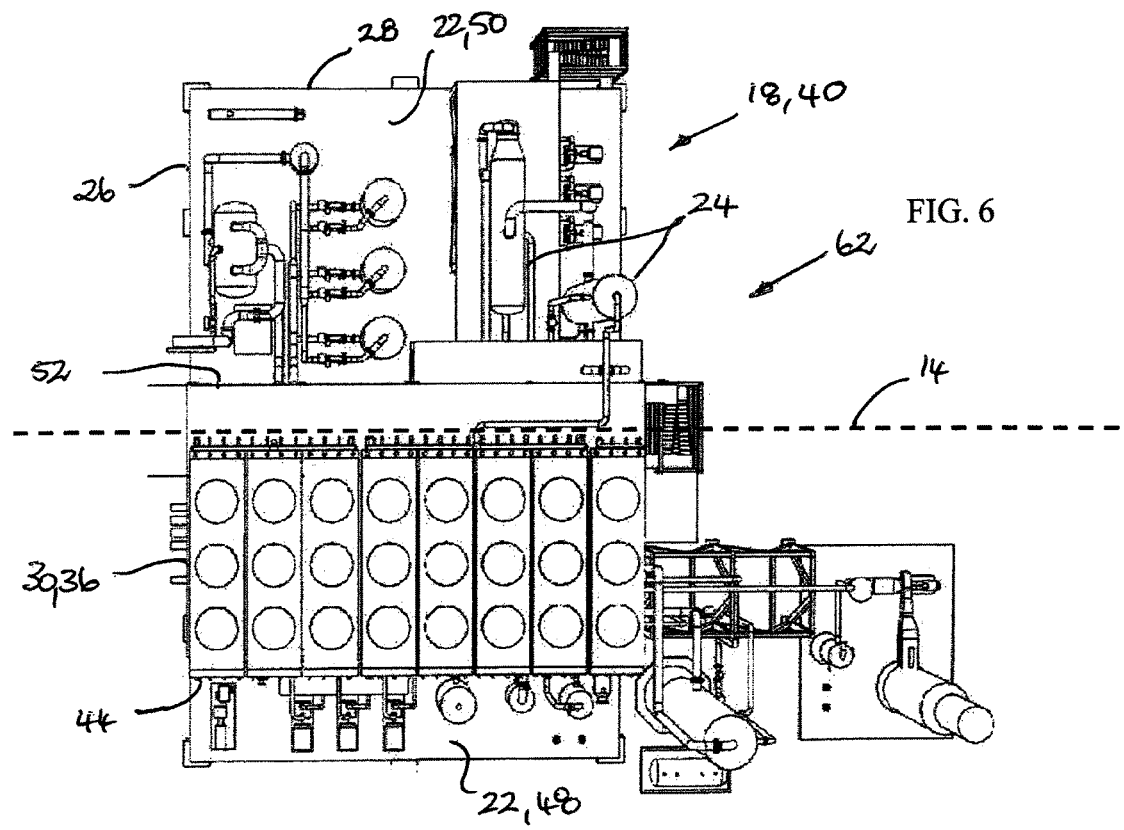
FIG. 6 is a plan view of the pre-treatment module of FIG. 5.

One embodiment of a pre-treatment module (18, 62) is now described with reference to FIGS. 5 and 6. In this embodiment, the pre-treatment module is a partially covered module (42) to maximise potential for pre-commissioning in the construction or assembly location. As best seen in FIG. 6, a first uncovered section (48) of the base (22) of the pre-treatment module (62) is located on a first side (44) of the heat exchanger bank (30) with a second uncovered section (50) of the module base being located on the second (opposite) side (52) of the heat exchanger bank (30). Upon installation at the production location, the major axis (26) of the base (22) of the pre-treatment module (62) is positioned so as to be perpendicular to major axis (14) of the train. In this configuration, the subset of heat exchangers operatively associated with the pre-treatment module are arranged to lie parallel to the longitudinal axis of the LNG production train after installation at the production location. The pre-treatment module includes equipment required to perform the function of removing contaminants by way of acid gas removal, dehydration and (optionally) mercury removal. In the illustrated embodiment, the acid gas removal unit column and associated knock-out vessel and pumps are located off-module to provide suitable spacing between other pre-treatment processing equipment and fired equipment. The adsorbers are located on-module with sufficient clearance for molecular sieve change-out. The pre-treatment module is designated as one of the exterior modules to provide ease of connection to the source of the natural gas inlet stream being fed to the pre-treatment module.

Figure 7:
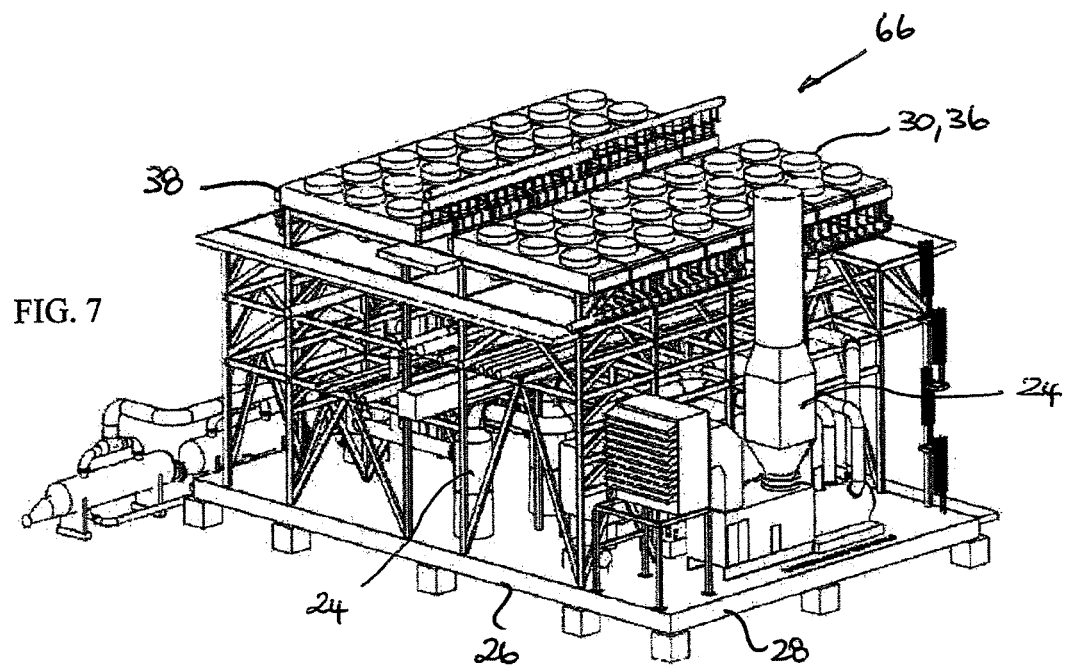
FIG. 7 is an isometric view of the propane compression module of the LNG production train illustrated in FIG. 2.
Figure 8:
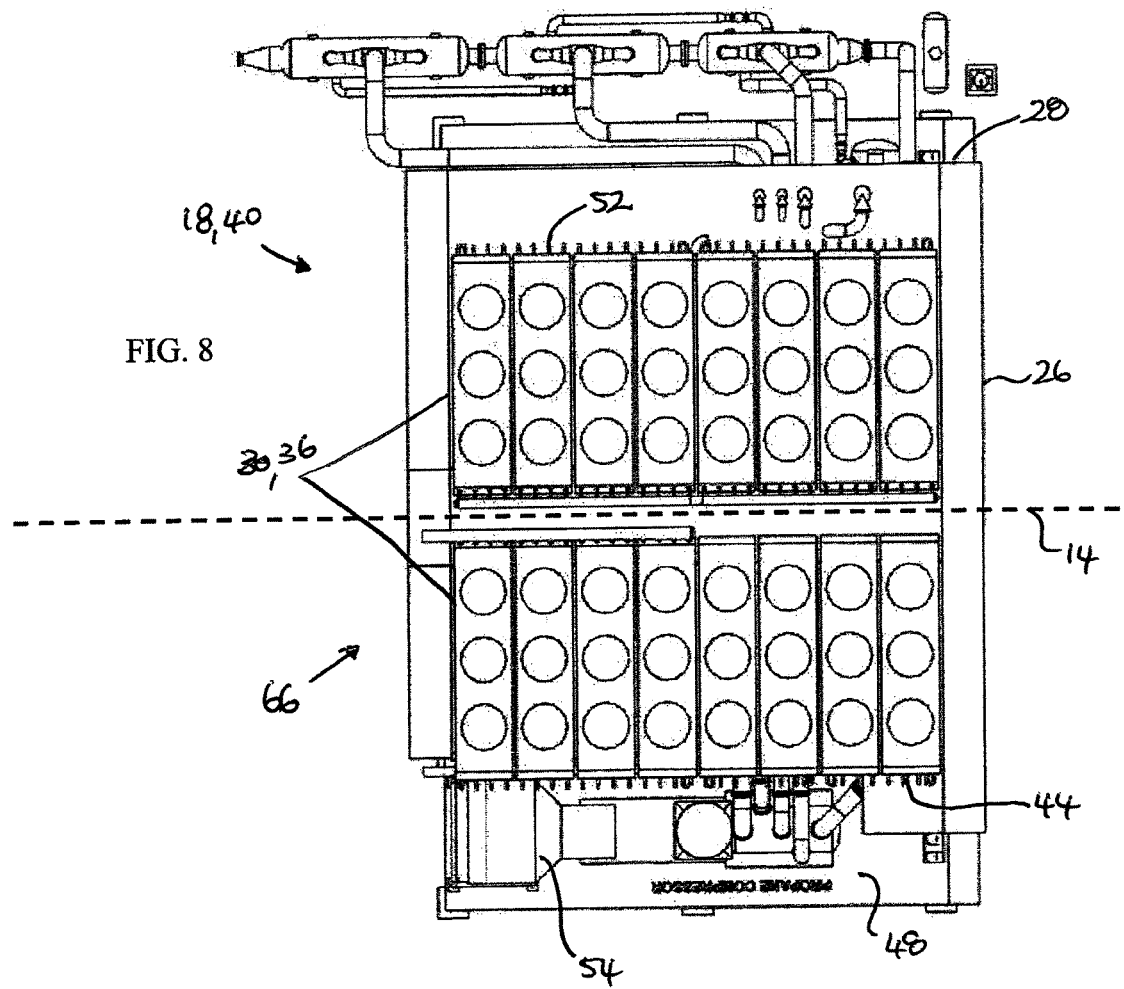
FIG. 8 is a plan view of the propane compression module of FIG. 7.

One embodiment of a propane compression module (66) is now described with reference to FIGS. 7 and 8. The propane suction drums are all located on a single module to maximise potential for commissioning at a construction or assembly location. In this embodiment, the propane compression module is a partially covered module to maximise potential for pre-commissioning in the construction or assembly location. As best seen in FIG. 8, a first uncovered section (48) of the base (22) of the propane compression module (66) is located on a first side (44) of the heat exchanger bank (30) with a second uncovered section (50) of the module base being located on the second (opposite) side (52) of the heat exchanger bank (30). Upon installation at the production location, the major axis (26) of the base (22) of the propane compression module (66) is positioned so as to be perpendicular to major axis (14) of the train. In this configuration, the subset of heat exchangers operatively associated with the propane compression module will be parallel to the longitudinal axis of the LNG production train after installation at the production location. A propane storage unit is positioned on a first side of the heat exchanger structure along with the C3 subcooler to minimise length of piping containing flammable liquid. The propane compression module is designated as one of the interior modules to provide a central position for ease of distribution of propane refrigerant to keep inventory as low as possible and to allow for location of one or more of the propane kettles on adjacent modules or off-module.

Figure 9:
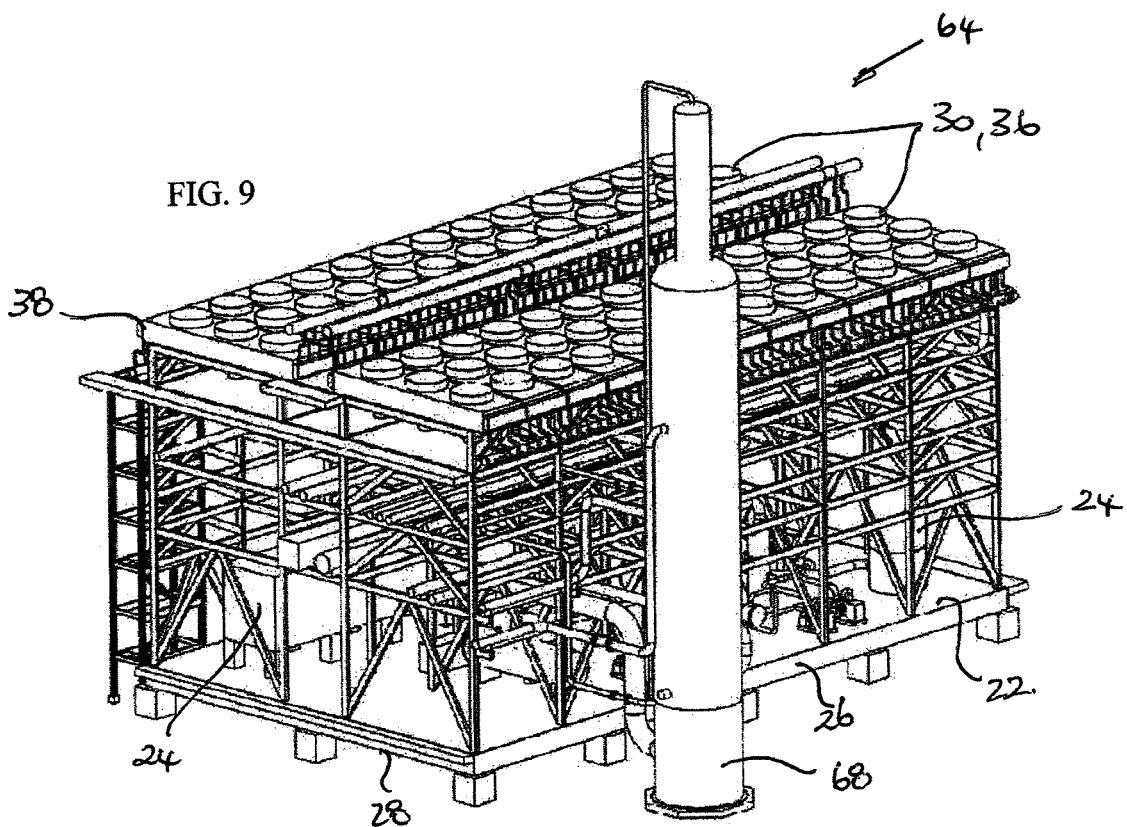
FIG. 9 is an isometric view of the propane condenser module of the LNG production train illustrated in FIG. 2.
Figure 10:
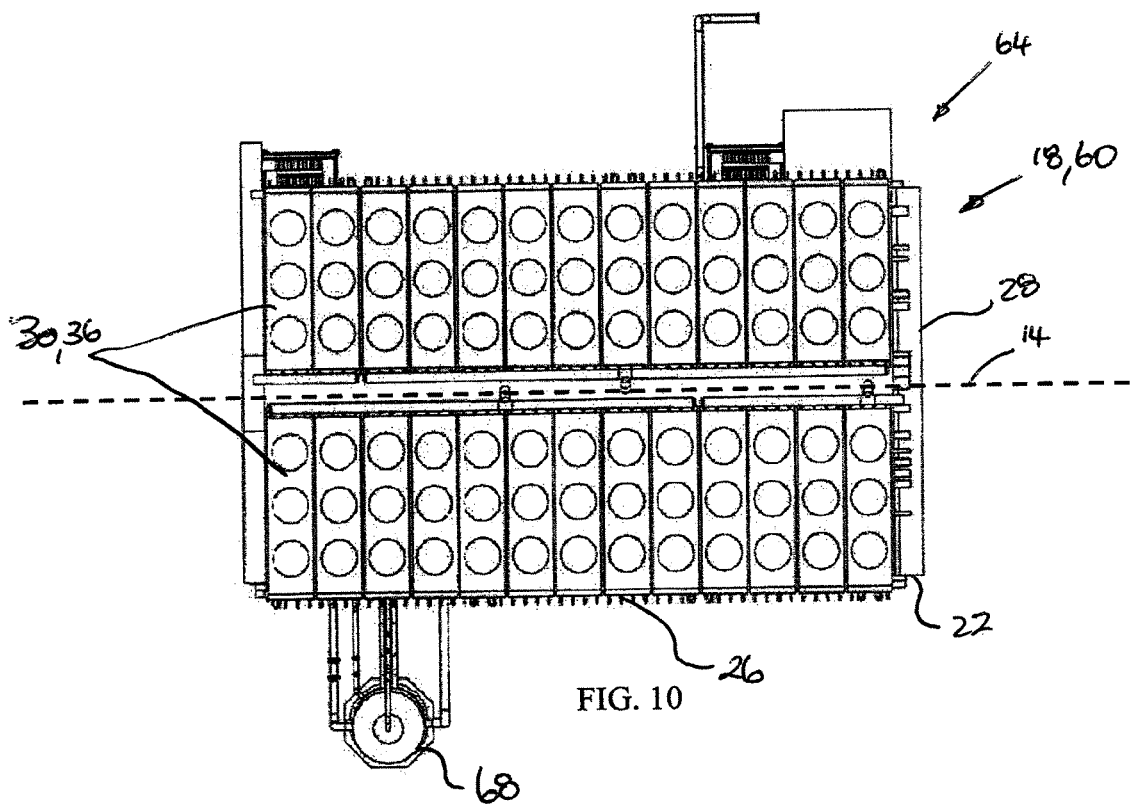
FIG. 10 is a plan view of the propane condenser module of FIG. 7.

One embodiment of a propane condenser module (64) is now described with reference to FIGS. 9 and 10. In this embodiment, the propane condenser module (64) is a fully covered module (60) as best seen in FIG. 10 because this module requires a comparatively large number of heat exchangers compared with the other modules. The propane condenser module has a longer major axis (26) than other modules to accommodate its requirement for a larger subset of heat exchangers in the heat exchanger bank (30). Upon installation at the production location, the major axis (26) of the base (22) of the propane condenser module (64) is positioned so as to be parallel to the major axis (14) of the train. In this configuration, the subset of heat exchangers operatively associated with the propane condenser module is arranged to lie parallel to the major axis of the LNG production train (12) after installation at the production location (20). In this manner, the orientation of the propane condenser module differs from the orientation of the other modules. The steam system and cooling water system equipment associated with the pre-determined function being performed by the propane condenser module can be safely located under the operatively associated heat exchangers of the propane condenser module as these inventories are non-flammable. The pre-determined function being performed by the propane condenser module includes pre-cooling of the natural gas using propane. The propane condenser module is conveniently positioned between the propane compression module (66) and the liquefaction module (70) so that the pre-treated natural gas can be pre-cooled prior to liquefaction.

Figure 11:
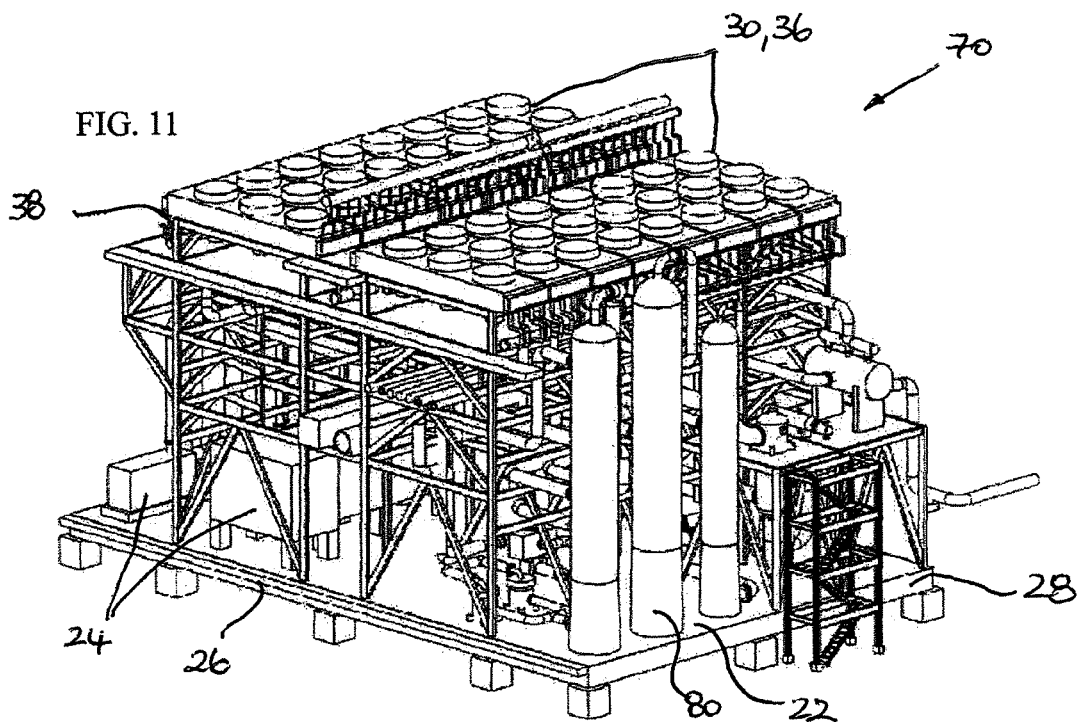
FIG. 11 is an isometric view of the liquefaction module of the LNG production train illustrated in FIG. 2.
Figure 12:
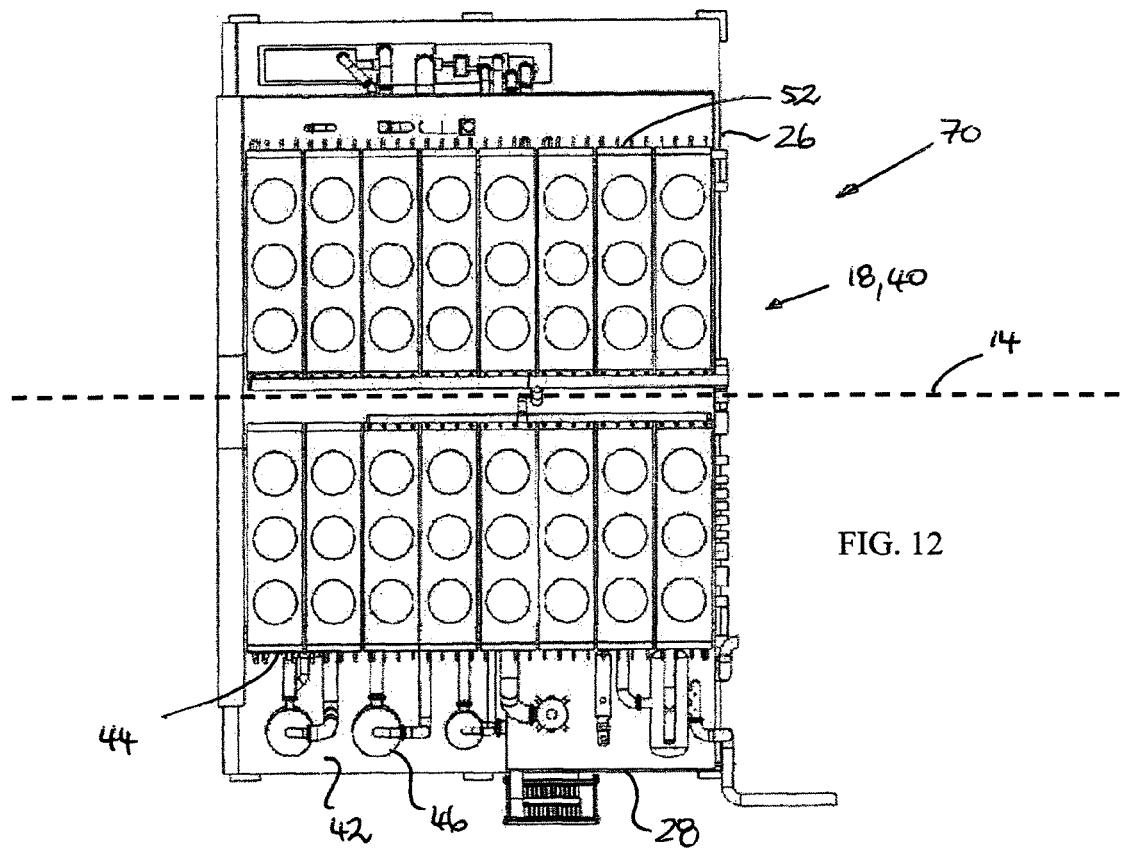
FIG. 12 is a plan view of the liquefaction module of FIG. 11.

One embodiment of a liquefaction module (70) is now described with reference to FIGS. 11 and 12. In the illustrated embodiment, the main cryogenic heat exchanger (68) is located off-module and positioned adjacent to the propane condenser module (64) as best seen in FIGS. 9 and 10, due to its size and weight and to mitigate the potential for damage during transport. Static equipment and pumps which are operatively associated with the main cryogenic heat exchanger (68) are positioned on the liquefaction module (70) on the same side of the heat exchanger bank as the main cryogenic heat exchanger to minimise interconnecting piping runs. If the decision is made to position the MCHE on the liquefaction module, the partially covered liquefaction module may be sized to accommodate a main cryogenic heat exchanger (MCHE). In the illustrated embodiment, the liquefaction module has only one uncovered section (42) to allow a steam-driven end-flash gas compressor (80) to be located on a first side of the liquefaction module (70). This allows easy overhead crane access to the end flash compressor whilst positioning the end flash compressor and overhead crane away from the MCHE. Upon installation at the production location, the major axis (26) of the base (22) of the liquefaction module (70) is positioned so as to be perpendicular to the major axis (14) of the train (12). In this configuration, the subset of heat exchangers operatively associated with the liquefaction module (70) will be parallel to the major axis (14) of the train (12) after installation at the production location (20). The equipment associated with nitrogen and helium removal may also be positioned in the liquefaction module if required.

Figure 13:
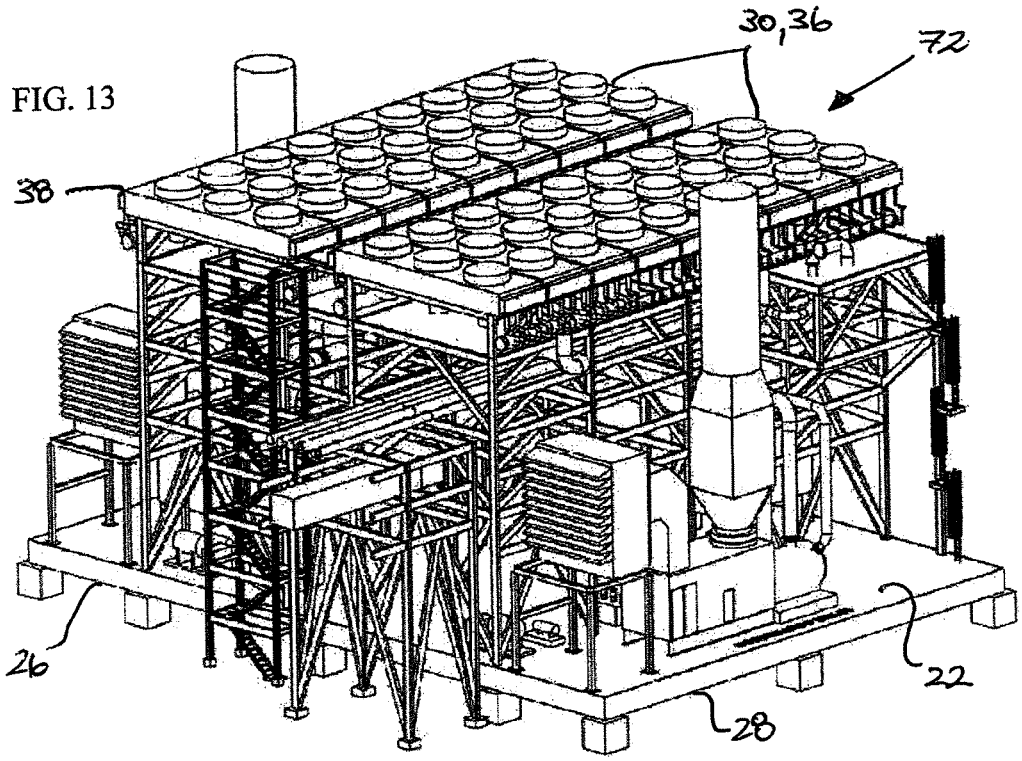
FIG. 13 is an isometric view of the mixed refrigerant compression module of the LNG production train illustrated in FIG. 2.
Figure 14:
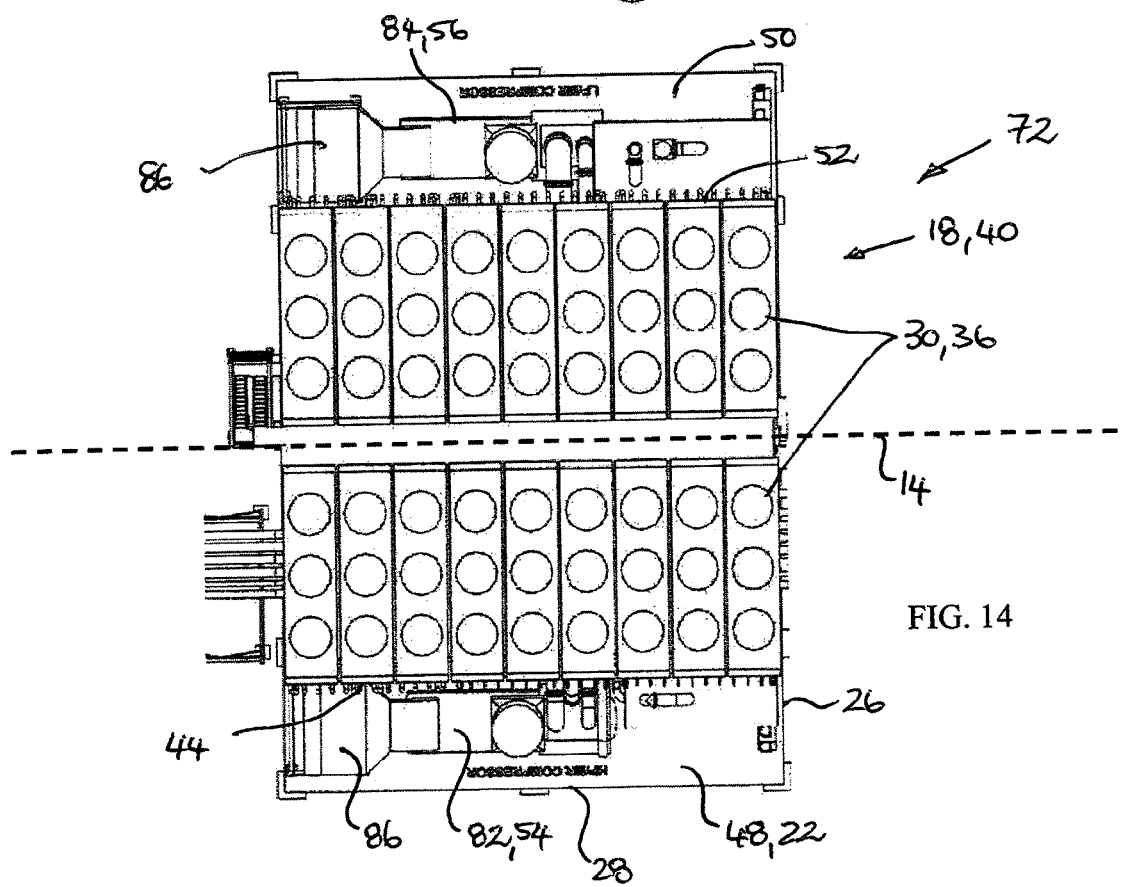
FIG. 14 is a plan view of the mixed refrigerant compression module of FIG. 13.

One embodiment of a second refrigerant (MR) compression module (72) is now described with reference to FIGS. 13 and 14. The mixed refrigerant compression module includes all of the process equipment required to perform the functional requirement of this module including the gas turbine, the compressor, interconnecting pipework, waste heat recovery, and recycle valves which are arranged on the module base. The subset of heat exchangers operatively associated with the MR compression module provides the required aftercooling and intercooling for the mixed refrigerant compressors. In this embodiment, the MR compression module (72) is a partially covered module (to maximise potential for pre-commissioning in the construction or assembly location). As best seen in FIG. 14, a first uncovered section (48) of the base (22) of the MR compression module (72) is located on a first side (44) of the heat exchanger bank (30) to accommodate the high pressure (HP) mixed refrigerant compressor (82). A second uncovered section (50) of the base (22) is located on the second (opposite) side (52) of the heat exchanger bank (30) to accommodate the low pressure (LP) mixed refrigerant compressor (84). Upon installation at the production location, the major axis of the base of the MR compression module is positioned so as to be perpendicular to the central longitudinal axis of the train. In this configuration, the subset of heat exchangers operatively associated with the MR compression module will be parallel to the longitudinal axis of the LNG production train after installation at the production location. The MR compression module is designated as one of the exterior modules.

Referring now to FIGS. 2 to 14, positioning the liquefaction module (70) between the first and second refrigerant compression modules (66 and 72, respectively) provides two key advantages. Firstly, the compressors associated with the second refrigerant (MR) module are long lead items. By positioning the MR compression module at the exterior of the LNG production train, the other modules can be transported to the production site and hooked up first if there is a delay in the delivery of the MR compressors. Secondly, while the subset of heat exchangers associated with the mixed refrigerant compression module are positioned in the first layer above the base of the mixed refrigerant compression module, the subset of heat exchangers operatively associated with the propane condenser module not only fully cover the module base of the propane condenser module but also span across to partially cover the module base of the adjacent liquefaction module as represented by the heavy dotted line in FIG. 4. The end-flash gas compressor requires only very few heat exchangers with the result that the liquefaction module has space available for additional heat exchangers. The service that needs additional space is the propane condenser which makes positioning the liquefaction module adjacent to the propane condenser module advantageous. This arrangement requires relatively long runs of MR piping to reach kettles located on the propane compression module for precooling. Prior art LNG production plant design relies on the placement of the liquefaction at the exterior of the train in order to minimise the length of LNG export piping. However, on balance, the arrangement shown in FIGS. 2 to 14 is favoured because the compressed MR operates at high pressure (>5000 kPag). If the train were instead arranged to minimise the length of MR runs at the expense of propane refrigeration piping which operates at lower pressure (<1000 kPag), the hydraulic losses would result in a more significant reduction to the liquefaction train capacity.

Each module has been designed to ensure that the main hydrocarbon inventories and all rotating equipment are positioned on the module edges in the uncovered sections of partially covered modules, and not underneath the air-cooling heat exchanger bank. This permits good access for maintenance and allows the long lead items to be incorporated into the module late in the construction sequence. The significantly reduced hydrocarbon inventory provides improved safety by way of making it easier to deal with the consequence of a leak. In addition to this, the overall layout of the LNG production train of the present invention is designed to for modularisation, with small compact equipment selected to suit modularisation rather than adopting the prior art approach of relying on economy of scale. Instead, smaller, more intensive equipment has been selected in order to be able to fit more items inside modules of a limited size and weight. The arrangement of the process equipment across each module in the illustrated embodiment was optimised to provide modules of uniform weight in the order of 2000 to 8000 tons, preferably 3000 to 4000 tons. The capacity of the optimised modularised train is around 2.5 million tons per annum (mtpa) of LNG production. If a higher capacity is desired at a particular production location, the modularised train may be one of a plurality of modularised trains. By way of example, two modularised trains may be arranged at a production location to provide an overall LNG production capacity of 5 mtpa.

One example of selecting smaller, more intensive equipment that is easier to modularise is the main refrigerant gas turbines. The starting point for this work was to utilise smaller more efficient aero-derivative gas turbines (86) that can be completely integrated into modules of a practical size. Aero-derivative gas turbines have been integrated into the modules, complete with the all of the elements of each compression system. This permits the complicated, large-diameter compressor suction and discharge lines to be built in at a construction location rather than having to be stick-built at the production location, whilst retaining a practical total module size/weight. Using smaller units and keeping the gas turbine and compressor integrated in the same module minimises the number of connections at site, and it also makes it possible for the compression system to be fully tested up to a nitrogen test run stage at the construction or assembly location. This extra level of commissioning and testing at the construction or assembly location is beneficial in reducing the amount of carry-over work that has to be done at a significantly higher labour rate at the production site. The variable speed nature of the aero-derivative gas turbines simplifies the compressor start-up and eliminates the need to depressurise refrigerant. Removing the need for starter/helper motors for gas turbines used in prior art LNG trains also significantly reduces the maximum electrical power demand of the modularized LNG train and helps to keep the module size down.

In the illustrated embodiment, a small number of selected equipment elements have been deliberately retained off-module in favour of being stick-built. These include the acid gas disposal unit which is stick-built for safety reasons to maintain separation of fired equipment. The acid gas absorber column is stick-built due to its weight and its high centre of gravity. The butted propane kettles are stick-built for safety reasons and because of their elevation. The main cryogenic heat exchanger is stick-built to protect against damage to the internal pipe-work that could occur during transport and because this item can have the longest lead time item in the construction schedule.

The production location can be onshore, offshore on a floating facility, offshore on a fixed facility, or a barge-mounted or grounded facility. By way of example, the modules may be floated-in using steel or concrete gravity based structures with integrated LNG storage, loading and boil-off gas re-liquefaction functionality with gas supplied to the production location via a subsea pipeline. The plurality of heat exchangers in the heat exchanger bank may be air coolers or water coolers. Alternatively, water coolers may be used for at least one module with air coolers used for at least one other module. The LNG plant may further include optional treatment steps such as product purification steps (helium removal, nitrogen removal) and non-methane product production steps (de-ethanizing, de-propanizing, sulphur recovery) if desired. The natural gas feed stream may be produced at and obtained from a natural gas or petroleum reservoir. As an alternative, the natural gas feed stream may also be obtained from another source, also including a synthetic source such as a Fischer-Tropsch process wherein methane is produced from synthesis gas.

It will be clearly understood that, although a number of prior art publications are referred to herein, this reference does not constitute an admission that any of these documents forms part of the common general knowledge in the art, in Australia or in any other country. In the summary of the invention, the description and claims which follow, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A liquefied natural gas production facility comprising:
a plurality of space-apart modules for installation at a production location to form a production train including a major axis and a minor axis, each module including a module base for mounting a plurality of plant equipment associated with a selected function assigned to said module, the module base including a major axis and a minor axis and wherein each module with its corresponding base is capable of being individually transported to the production site for installation at the production site to form the production train;
a plurality of heat exchangers arranged to run parallel to the major axis of the production train to form a heat exchanger bank including a major axis and a minor axis, wherein the major axis of the bank is parallel to the major axis of the train;
wherein each of at least two modules is provided with a subset of the plurality of heat exchangers, wherein the subset of the plurality of heat exchangers is arranged on a first level vertically offset from the base of the at least two modules, and the two modules are adjacent each other in the train and wherein the bank extends along both of the at least two modules in the train:
wherein at least a first of the two modules is a partially covered module where the subset of the plurality of heat exchangers partially covers the base of the partially covered module and the subset of heat exchangers extend for a length of the minor axis of the base of the partially covered module, and wherein the major axis of the base of the partially covered module is arranged to lie perpendicular to the major axis of the train when the partially covered module is installed at the production location; and
wherein the module bases of the plurality of modules in the production facility lie in the same horizontal plane.

2. The liquefied natural gas production facility of claim 1, wherein the heat exchanger bank includes a footprint and the base of the partially covered module projects transversely outwardly beyond the footprint of the heat exchanger bank to provide an uncovered section of the module base on a first side of the heat exchanger bank and wherein the uncovered section of the module base is sized for mounting a selected piece of process equipment.

3. The liquefied natural gas production facility of claim 1, wherein the heat exchanger bank includes a footprint and the base of the partially covered module projects transversely outwardly beyond the footprint of the heat exchanger bank to provide a first uncovered section of the module base on a first side of the heat exchanger bank and a second uncovered side of the module base on a second side of the heat exchanger bank, wherein the first uncovered section is sized for mounting a first selected piece of process equipment and the second uncovered section is sized for mounting a second selected piece of process equipment.

4. The liquefied natural gas production facility of claim 2, wherein the selected piece of process equipment comprises a rotating piece of equipment associated with a circulating refrigerant.

5. The liquefied natural gas production facility of claim 2, wherein the selected piece of equipment comprises a piece of equipment including a flammable inventory.

6. The liquefied natural gas production facility of claim 2, wherein either (a) one of the pluralities of modules comprises a second refrigerant compression module for compressing a second refrigerant vapour stream and the selected piece of equipment comprises a compressor associated with the second refrigerant module, or (b) one of the pluralities of modules is a liquefaction module and the selected piece of equipment comprises one or both of an end-flash compressor and a main cryogenic heat exchanger.

7. The liquefied natural gas production facility of claim 3, wherein one or both or the first and second selected pieces of equipment comprises a piece of equipment including an overall height that is taller than the height of the first level.

8. The liquefied natural gas production facility of claim 1, wherein at least one of the plurality of modules is constructed at a construction location or assembled at an assembly location prior to transport to the production location, and wherein at least one of the plurality of modules is tested for verification purposes at the construction or assembly location.

9. The liquefied natural gas production facility of claim 1, wherein the heat exchanger bank is arranged such that a subset of the plurality of heat exchangers that is operatively associated with the selected function of a module is arranged on a first level vertically offset from the base of said module.

10. The liquefied natural gas production facility of claim 1, wherein the heat exchanger bank is arranged such that a subset of the plurality of heat exchangers that is operatively associated with the selected function of a module is arranged on a first level vertically offset from the base of said module and an adjacent module.

11. The liquefied natural gas production facility of claim 1, wherein each of the plurality of modules is a partially covered module.

12. The liquefied natural gas production facility of claim 1, wherein the subset of heat exchangers of at least one of the modules includes a footprint that covers at least 90% of the footprint of the module base of the at least one of the modules to form a fully covered module including a major axis and a minor axis, the major axis of the fully covered module being arranged to lie parallel to the major axis of the train when the fully covered module is installed at the production location.

13. The liquefied natural gas production facility of claim 1, wherein one of the plurality of modules comprises a pre-treatment module for removing contaminants from a natural gas feed stream to produce a pre-treated natural gas stream.

14. The liquefied natural gas production facility of claim 13, wherein the pre-treatment module comprises a partially covered module including a first uncovered section of the base on a first side of the heat exchanger bank and a second uncovered section of the module on a second side of the heat exchanger bank after installation at the production location.

15. The liquefied natural gas production facility of claim 1, wherein one of the plurality of modules comprises a first refrigerant condenser module for pre-cooling a pre-treated natural gas stream to produce a pre-cooled gas stream and a first refrigerant vapour stream.

16. The liquefied natural gas production facility of claim 15, wherein the first refrigerant condenser module comprises a fully covered module.

17. The liquefied natural gas production facility of claim 1, wherein one of the plurality of modules comprises a first refrigerant compression module for compressing a first refrigerant vapour stream to produce a compressed first refrigerant stream for recycle to a first refrigerant condenser module.

18. The liquefied natural gas production facility of claim 17, wherein the first refrigerant compression module comprises a partially covered module including a first uncovered section of the base on a first side of the heat exchanger bank and a second uncovered section of the module on a second side of the heat exchanger bank after installation at the production location.

19. The liquefied natural gas production facility of claim 1, wherein one of the plurality of modules comprises a liquefaction module operatively associated with a main cryogenic heat exchanger for further cooling a pre-cooled gas stream through indirect heat exchange with a second refrigerant to produce a liquefied natural gas product stream and a second refrigerant vapour stream.

20. The liquefied natural gas production facility of claim 19, wherein the liquefaction module comprises a partially covered module including a first uncovered section of the base on a first side of the heat exchanger bank and a second uncovered section of the module on a second side of the heat exchanger bank after installation at the production location.

21. The liquefied natural gas production facility of claim 1, wherein one of the plurality of modules comprises a second refrigerant compression module for compressing a second refrigerant vapour stream to produce a compressed second refrigerant stream for recycle to a main cryogenic heat exchanger.

22. The liquefied natural gas production facility of claim 21, wherein the second refrigerant compression module comprises a partially covered module including a first uncovered section of the base on a first side of the heat exchanger bank and a second uncovered section of the module on a second side of the heat exchanger bank after installation at the production location.

23. The liquefied natural gas production facility of claim 22, wherein a first refrigerant compressor is arranged on the first uncovered section and a second refrigerant compressor is arranged on the second uncovered section.

24. The liquefied natural gas production facility of claim 23, wherein one or both of the first and second compressors comprises a variable speed compressor.

25. The liquefied natural gas production facility of claim 23, wherein one or both of the first and second compressors is driven by an aero-derivative gas turbine.

26. The liquefied natural gas production facility of claim 15, wherein the first refrigerant comprises propane.

27. The liquefied natural gas production facility of claim 21, wherein the second refrigerant comprises a mixed refrigerant hydrocarbon mixture.

28. The liquefied natural gas production facility of claim 1, wherein each of the plurality of modules is substantially equally sized.

29. The liquefied natural gas production facility of claim 1, wherein each of the plurality of modules has a weight in the range of 2000 to 8000 tons or 3000 to 4000 tons.

30. The liquefied natural gas production facility of claim 15 wherein the production location is onshore, offshore on a floating facility, offshore on a fixed facility, barge-mounted or grounded facility.

31. The liquefied natural gas production facility of claim 1, wherein the heat exchangers comprise air-cooled heat exchangers.

32. A module for use in the liquefied natural gas production facility of claim 1.

33. The liquefied natural gas production facility of claim 3, wherein one or both of the selected pieces of equipment comprises a rotating piece of equipment associated with a circulating refrigerant.

34. The liquefied natural gas production facility of claim 3, wherein one or both of the selected pieces of equipment comprises a piece of equipment including a flammable inventory.

35. The liquefied natural gas production facility of claim 3, wherein either (a) one of the pluralities of modules comprises a second refrigerant compression module for compressing a second refrigerant vapour stream and one or both of the selected pieces of equipment comprises a compressor associated with the second refrigerant module, or (b) one of the pluralities of modules is a liquefaction module and one or both of the selected pieces of equipment comprises one or both of an end-flash compressor and a main cryogenic heat exchanger.

36. The liquefied natural gas production facility of claim 1, wherein each module has a footprint area and the production facility has a footprint area which is equal to or greater than a sum of the footprint areas of each of the modules.

37. The liquefied natural gas production facility of claim 1, wherein the heat exchanger bank extends across all of the plurality of modules, wherein each of the modules comprises a subset of heat exchangers that are incorporated in the heat exchanger bank.

38. The liquefied natural gas production facility of claim 1, wherein each of the plurality of modules is provided with a subset of the plurality of heat exchangers, the subset of the plurality of heat exchangers is arranged on a first level vertically offset from the base of that module, the modules are side by side in alignment with the major axis of the train, and the bank extends along all of the modules in the train.

* * * * *